US010520800B2

(12) United States Patent
Ikeo

(10) Patent No.: US 10,520,800 B2
(45) Date of Patent: Dec. 31, 2019

(54) PHOSPHOR WHEEL, PHOSPHOR WHEEL DEVICE INCLUDING THE SAME, LIGHT CONVERSION DEVICE, AND PROJECTION DISPLAY APPARATUS

(71) Applicant: Panasonic Intellectual Property Management Co., Ltd., Osaka (JP)

(72) Inventor: Kenji Ikeo, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/129,886

(22) Filed: Sep. 13, 2018

(65) Prior Publication Data

US 2019/0094671 A1    Mar. 28, 2019

(30) Foreign Application Priority Data

Sep. 25, 2017  (JP) ................................. 2017-184022
Sep. 11, 2018  (JP) ................................. 2018-169852

(51) Int. Cl.
| | | |
|---|---|---|
| *G03B 21/14* | (2006.01) | |
| *H04N 9/31* | (2006.01) | |
| *G03B 21/16* | (2006.01) | |
| *G02B 26/00* | (2006.01) | |
| *G03B 21/20* | (2006.01) | |

(52) U.S. Cl.
CPC ........... *G03B 21/16* (2013.01); *G02B 26/008* (2013.01); *G03B 21/204* (2013.01); *H04N 9/3111* (2013.01)

(58) Field of Classification Search
CPC .... G02B 27/10; G02B 27/18; G02B 27/1006; G02B 27/1053; H04N 9/31; H04N 9/3152; H04N 9/3161; H04N 9/3164
See application file for complete search history.

(56) References Cited

U.S. PATENT DOCUMENTS

| | | | | |
|---|---|---|---|---|
| 9,915,418 | B2* | 3/2018 | Yamagishi | ............. G03B 33/08 |
| 9,983,467 | B2* | 5/2018 | Kitade | .................... G03B 33/08 |
| 2013/0169938 | A1* | 7/2013 | Huang | ................... G03B 21/16 |
| | | | | 353/31 |
| 2016/0077326 | A1* | 3/2016 | Yamagishi | ........... G02B 26/008 |
| | | | | 353/61 |
| 2017/0192346 | A1* | 7/2017 | Chikayama | ............ G03B 21/16 |
| 2018/0224731 | A1 | 8/2018 | Yoshikawa | |
| 2019/0146314 | A1* | 5/2019 | Yoshikawa | ............ G03B 21/16 |

FOREIGN PATENT DOCUMENTS

| | | |
|---|---|---|
| JP | 2016-053608 | 4/2016 |
| WO | 2017/098705 | 6/2017 |

* cited by examiner

*Primary Examiner* — William C. Dowling
(74) *Attorney, Agent, or Firm* — Wenderoth, Lind & Ponack, L.L.P.

(57) ABSTRACT

A phosphor wheel includes a first face that has a phosphor layer, a second face located on an opposite side to the first face, a first blade provided to project from one of the first face and the second face, and a passage that sends air to the second face from the first face. The first blade is provided to send air on a side of the first face to a side of the second face through the passage during rotation of the phosphor wheel.

14 Claims, 42 Drawing Sheets

33b  33cb  33a  33db  333f
     (13c)      (13d)

533cb  33f  33db
(513c)      (13d)

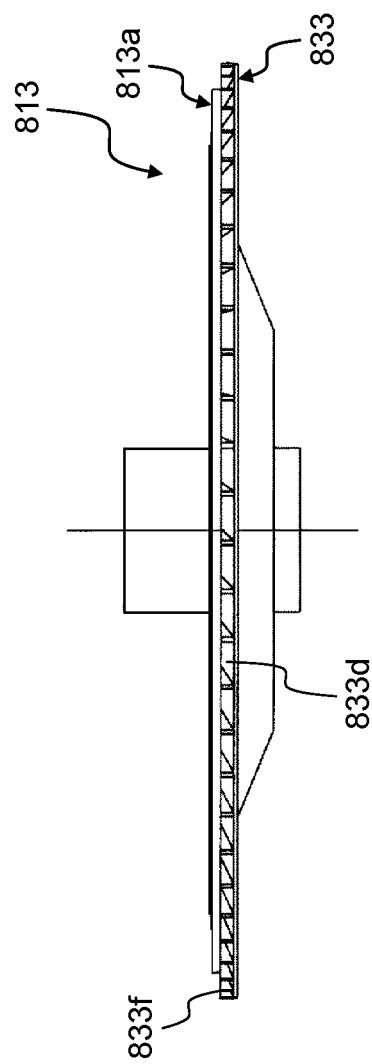

PHOSPHOR WHEEL, PHOSPHOR WHEEL DEVICE INCLUDING THE SAME, LIGHT CONVERSION DEVICE, AND PROJECTION DISPLAY APPARATUS

BACKGROUND

1. Field of the Invention

The disclosure relates to a phosphor wheel, a phosphor wheel device including the same, a light conversion device, and a projection display apparatus.

2. Description of the Related Art

Patent Literature 1 (International Patent Publication No. 2017/098705) has disclosed a projection display apparatus having a disc-shaped phosphor wheel on which a phosphor layer is formed. The phosphor wheel of Patent Literature 1 is provided with a plurality of openings formed along a circumferential direction thereof, and blades disposed adjacent to the plurality of openings. In the phosphor wheel, airflow is generated by the blades to cool the phosphor layer.

SUMMARY

As higher brightness is required for a projection display apparatus, a higher cooling capability has been demanded for a phosphor wheel.

The disclosure provides a phosphor wheel whose cooling capability is improved, a phosphor wheel device including the same, a light conversion device, and a projection display apparatus.

A phosphor wheel of a first exemplary embodiment in the present disclosure includes a first face that has a phosphor layer, a second face located on an opposite side to the first face, a first blade provided to project from one of the first face and the second face, and a passage that sends air to the second face from the first face. The first blade is provided to send air on a side of the first face to a side of the second face through the passage during rotation of the phosphor wheel.

The present disclosure further provides a phosphor wheel device including the phosphor wheel in the present disclosure, a light conversion device, and a projection display apparatus.

According to the present disclosure, cooling capability of the phosphor wheel can be improved.

BRIEF DESCRIPTION OF DRAWINGS

FIG. 14C is a side view of the phosphor wheel; and

DETAILED DESCRIPTION OF THE PREFERRED EMBODIMENTS

Hereinafter, exemplary embodiments will be described, in detail, with reference to the drawings as necessary. However, description that is in more detail than necessary is occasionally omitted. For example, detailed description about already well-known matters and overlapped description about the substantially same configurations are occasionally omitted. This is because the following description is avoided from being unnecessarily redundant, and a person skilled in the art is made to easily understand the present disclosure.

The accompanying drawings and the following description are provided for a person skilled in the art to fully understand the present disclosure, and do not intend to limit the subject matter described in Claims.

First Exemplary Embodiment

A phosphor wheel device equipped with a phosphor wheel in accordance with a first exemplary embodiment of the present disclosure, a light conversion device, and a projector (projection display apparatus) 100 will be described.

1. Structure 1-1. Structure of Projector

Figure 1:
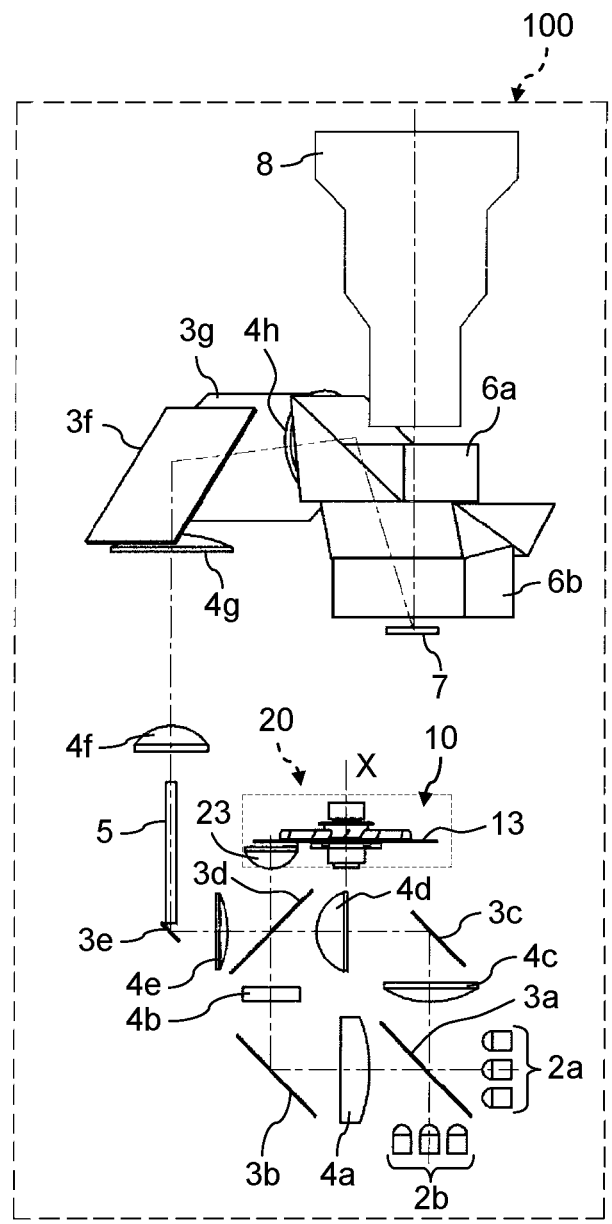
FIG. 1 is a schematic diagram showing a projection display apparatus in accordance with a first exemplary embodiment of the present disclosure.

FIG. 1 is a view showing a schematic structure of a projector in accordance with a first exemplary embodiment of the present disclosure. Note that, FIG. 1 shows the projector (an example of a projection display apparatus) to which a phosphor wheel of the present disclosure is applied, and the phosphor wheel of the present disclosure is also applicable to projection display apparatuses having the other structures.

Projector 100 is a graphic display device of a DLP (Digital Light Processing) type in which a spatial-light-modulation element (for example, DMD (Digital Micromirror Device) 7 (display element)) is mounted to modulate light according to a video signal. Projector 100 includes blue LDs (laser diode) 2a and 2b (light source), various kinds of optical components, and light conversion device 20 including phosphor wheel device 10 that emits fluorescence excited by laser light.

Note that, projector 100 of the present exemplary embodiment employs a three-chip DLP method in which three DMDs 7 corresponding to three primary colors of R, G, and B, respectively, are mounted thereon, but FIG. 1 depicts only one DMD 7 for convenience of description.

As shown in FIG. 1, projector 100 of the present exemplary embodiment includes two blue LDs 2a and 2b as a light source. Further, as optical components, projector 100 includes separation mirror 3a, mirrors 3b and 3c, dichroic mirror 3d, mirrors 3e, 3f, and 3g, lenses 4a to 4h, rod integrator 5, TIR (Total Internal Reflection) prism 6a, color prism 6b, DMD7, projection lens 8, and light conversion device 20.

Blue LDs 2a and 2b, which are the light source of projector 100, each are configured to include a plurality of LDs (m×n pieces) in vertical and horizontal directions. Further, blue LDs 2a and 2b are arranged such that their directions are orthogonal to each other. Thus, laser lights emitted from blue LDs 2a and 2b travel in directions orthogonal to each other.

Separation mirror 3a is provided near an intersection at which the laser lights emitted from two blue LDs 2a and 2b intersect with each other. By separation mirror 3a, the laser light emitted from each of blue LDs 2a and 2b is separated into two parts, which are deflected in two directions.

The laser lights, which are separated by separation mirror 3a and travel in the two directions, each are deflected at 90 degrees by mirrors 3b and 3c.

Dichroic mirror 3d, which is constituted by using special photonics materials, reflects light with one specific wavelength and passes light with the other wavelengths. In the present exemplary embodiment, dichroic mirror 3d reflects red light and green light, while passing the blue laser lights emitted from blue LDs 2a and 2b. Herein, the red light and green light are obtained by converting the blue laser lights in phosphor wheel device 10, described later.

Mirrors 3e, 3f, and 3g guide light of three primary colors R, G, and B, which pass through or reflect on dichroic mirror 3d, to projection lens 8 disposed on the most downstream side.

Lenses 4a to 4h converge or collimate the blue laser light, which are emitted from blue LDs 2a and 2b serving as the light source, and the red light and green light obtained by converting the blue laser light in phosphor wheel device 10.

Rod integrator 5 makes illumination of incidence light uniform. The light, which have entered rod integrator 5, repeats total internal reflection in an inner peripheral face of rod integrator 5, and are emitted from an emission face as uniform illumination light. Rod integrator 5 is provided such that the light reflected on mirror 3e enters rod integrator 5.

TIR (total internal reflection) prism 6a uses its total-internal-reflection function to change a direction in which incident light travels therein.

Color prism 6b divides the light, which has entered color prism 6b, into each light of three primary colors R, G, and B, and reflects them to three DMDs 7 that are disposed on its downstream side and corresponding to the respective colors.

Three DMDs 7 are provided to correspond to the three primary colors of R, G, and B one by one. Each of three DMDs 7 modulates the corresponding light, which has entered therein, according to a video signal and emits the modulated light to projection lens 8 through color prism 6b and TIR (total internal reflection) prism 6a.

Projection lens 8 is disposed on the most downstream side of optical components mounted on projector 100. By projection lens 8, the light that has entered projection lens 8 through TIR prism 6a, DMD 7, and color prism 6b is expanded and projected on a screen (not shown).

Light conversion device 20 is an apparatus that converts the blue laser lights emitted from blue LDs 2a and 2b, described later, into red light and green light through a fluorescent substance, and includes phosphor wheel device 10. Note that, a structure of light conversion device 20 including phosphor wheel device 10 will be described in detail in the later stage.

<Projection of an Image by Projector 100>

The laser lights emitted from two blue LDs 2a and 2b are separated into two parts, which are deflected in two directions, by separation mirror 3a disposed near an intersection at which the laser lights intersect with each other.

A first blue laser light, which is one of the two parts, passes through dichroic mirror 3d trough lens 4c, mirror 3c, and lens 4d. Subsequently, after passing through lens 4e, the first blue laser light is reflected at 90 degrees by mirror 3e, and enters rod integrator 5.

A second blue laser light passes through dichroic mirror 3d through lens 4a, mirror 3b, and lens 4b, and is emitted to phosphor layer 16 of phosphor wheel 13 in phosphor wheel device 10. At this time, red fluorescent substance and green fluorescent substance of phosphor layer 16 are excited by the second blue laser light, and emits red light and green light. In other words, the second blue laser light is converted into red light and green light.

At that time, phosphor wheel 13 is driven to rotate by motor 14 in order to disperse energy. This makes it possible to prevent the fluorescent substances from burning, when the red and green fluorescent substances are irradiated with the blue laser light.

In dichroic mirror 3d, the red light and green light, which are obtained by converting the second blue laser light, are reflected at 90 degrees and enter rod integrator 5.

The each light of three primary colors R, G, and B is mixed in rod integrator 5 and enters a boundary layer of TIR prism 6a through lens 4f, mirrors 3f and 3g, and lens 4h. The each light of three primary colors R, G, and B is reflected inside TIR prism 6a and travel to color prism 6b, because TIR prism 6a reflects light at a total-internal-reflection angle.

In color prism 6b, the each light of three primary colors R, G, and B are separated one by one, and each light enters a corresponding one of three DMDs 7.

Each light forming an image in DMD 7 and reflected is synthesized by color prism 6b, passes through the boundary layer of TIR prism 6a, and enters projection lens 8, so that the image is projected on a projection screen.

In projector 100 of the present exemplary embodiment, the blue laser lights emitted from blue LDs 2a and 2b, which serve as an excitation light source, excite red fluorescent substance and green fluorescent substance that are contained in phosphor layer 16 provided on a surface of phosphor wheel 13, and generate red light and green light. At this time, all of energies of the blue laser light are not converted into fluorescence luminescence, but a part of them is converted into thermal energy. This may increase temperature of the red fluorescent substance and the green fluorescent substance.

Herein, a fluorescent substance is likely to be deteriorated in optical conversion efficiency when temperature increases. Further, heat discoloration or the like may occur in a binder that fixes the fluorescent substance on phosphor wheel 13 to form phosphor layer 16. For that reason, phosphor wheel 13 is driven to rotate by motor 14 in order to prevent the increase in heat of the fluorescent substance.

As higher brightness is required for projector 100, however, the output of excitation light (laser light) is increased. Accordingly, phosphor layer 16 and the surrounding area thereof cannot be cooled sufficiently even if phosphor wheel 13 is driven to rotate. Therefore, it is necessary to blow cooling air over phosphor layer 16 and the surrounding area thereof to cool the fluorescent substance actively.

Thus, the present exemplary embodiment is configured to supply cooling air to phosphor layer 16 of phosphor wheel 13. Although concrete configuration is described later, the present exemplary embodiment provides blades 33a, 33b, and 33f, while providing openings 13c and 13d formed through phosphor wheel 13 in a thickness direction (see FIG. 7A).

Note that, structures of phosphor wheel device 10 and light conversion device 20 including phosphor wheel device 10 will be described, in detail, in the later stage.

1-2. Structure of Light Conversion Device

Figure 2:
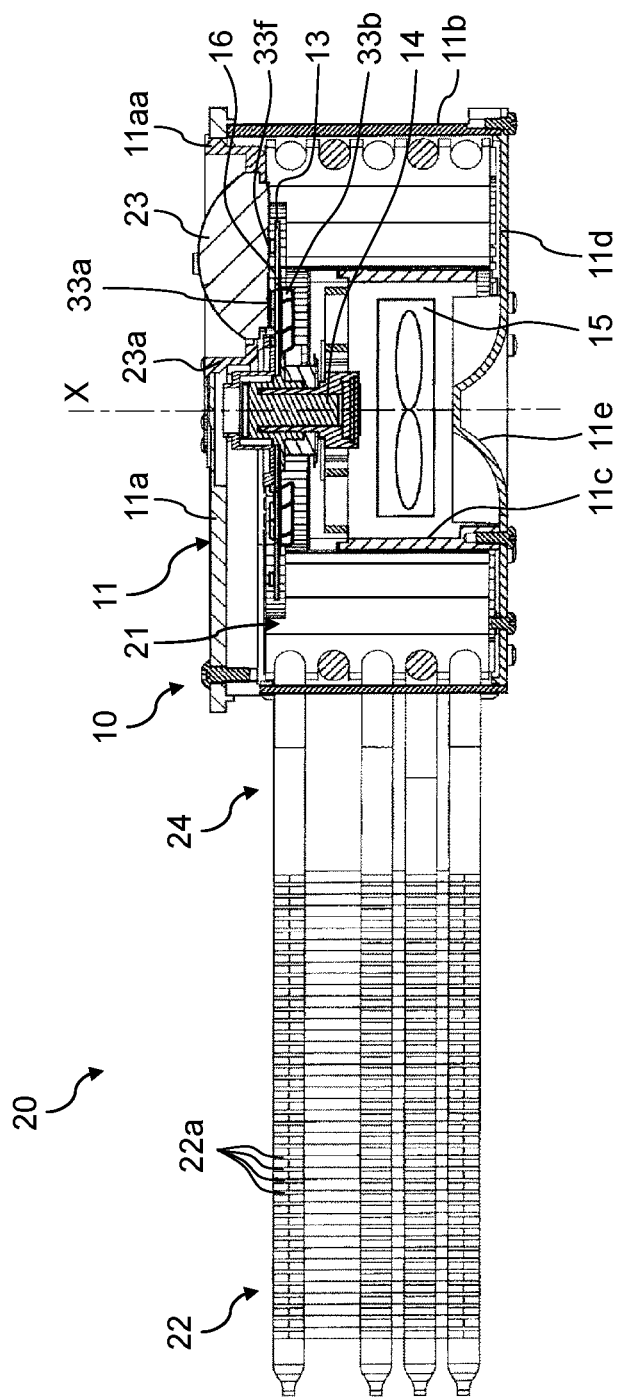
FIG. 2 is a cross-sectional view showing a structure of a principal part of a light conversion device.
Figure 3:
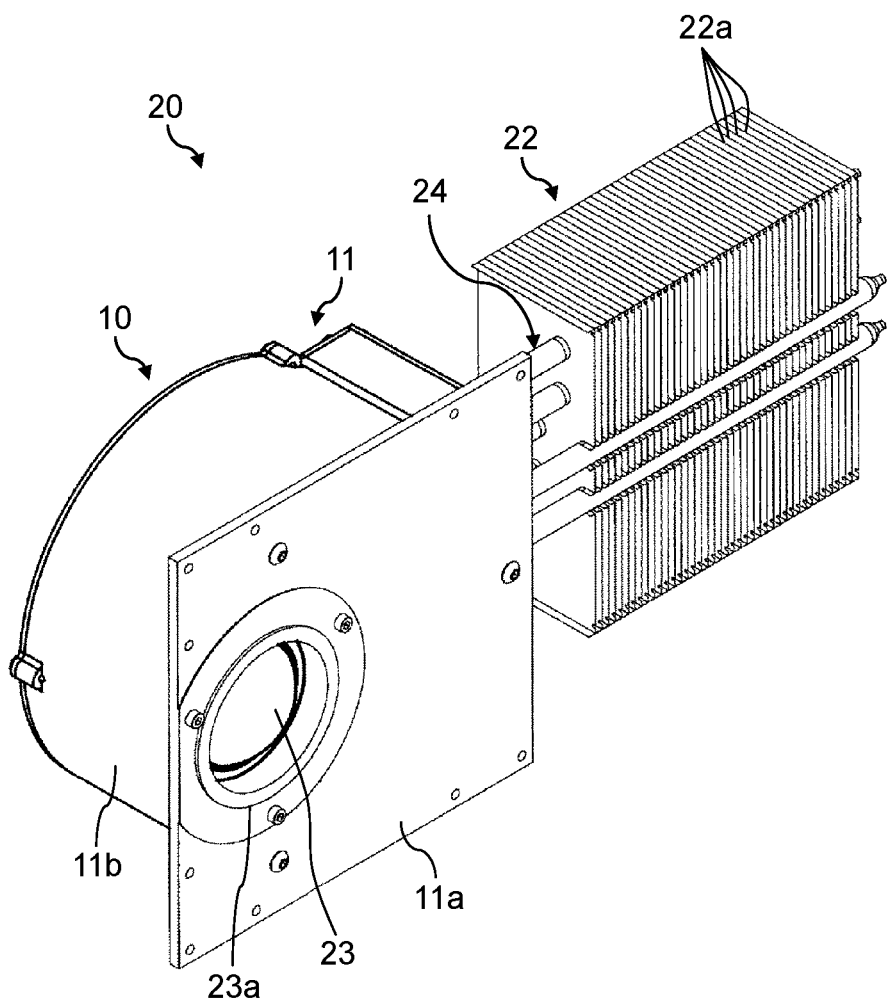
FIG. 3 is a perspective view of the light conversion device.
Figure 4A:
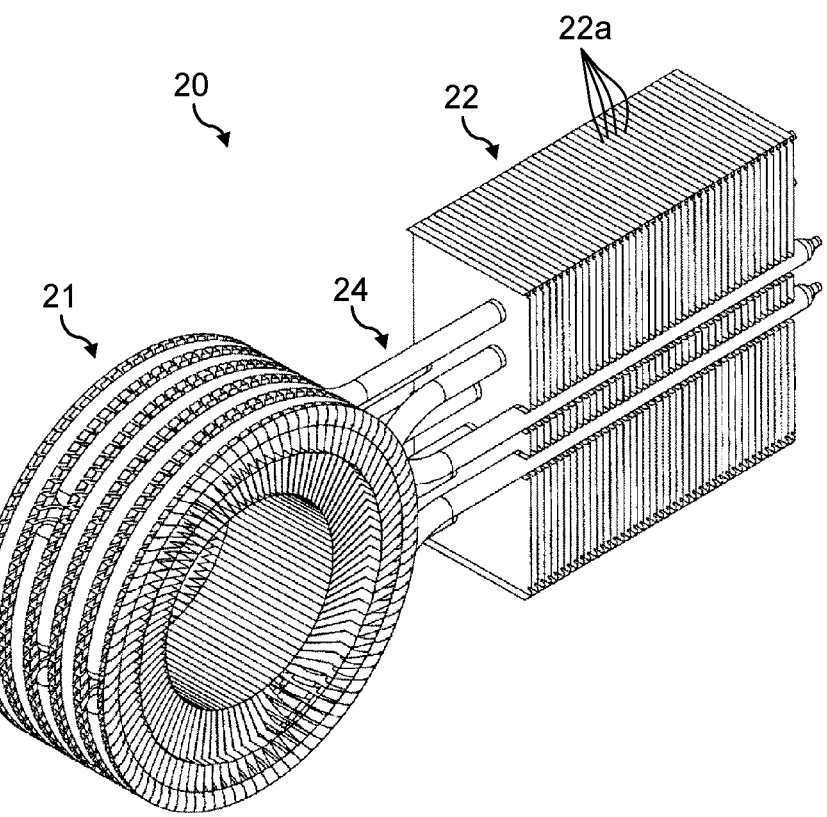
FIG. 4A is a perspective view showing structures of a heat absorber disposed inside the light conversion device, and a heat dissipater thermally connected to the heat absorber.
Figure 4B:
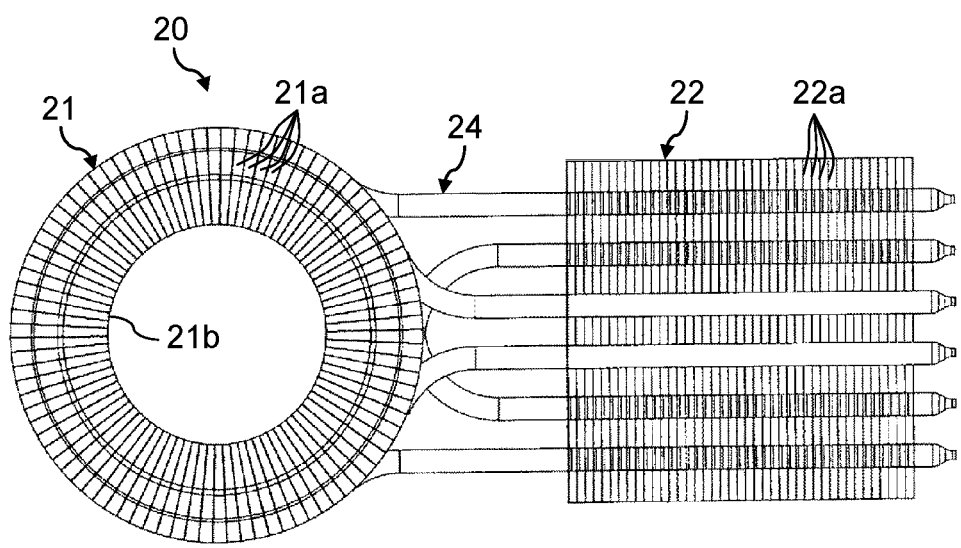
FIG. 4B is plan views of the heat absorber and the heat dissipater in FIG. 4A.

A structure of the light conversion device will be described with reference to FIGS. 2, 3, 4A and 4B. FIG. 2 is a cross-sectional view showing a structure of a principal part of light conversion device 20. FIG. 3 is a perspective view of light conversion device 20. FIG. 4A is perspective views showing structures of a heat absorber disposed inside the light conversion device and a heat dissipater thermally connected to the heat absorber. FIG. 4B is a plan view of the heat absorber and the heat dissipater in FIG. 4A.

As shown in FIG. 2, light conversion device 20 includes phosphor wheel device 10 described later, heat absorber 21, heat dissipater 22, optical lens 23, and heat pipe 24.

Phosphor wheel device 10 converts the blue laser light into red light and green light by irradiating a fluorescent substance with blue laser lights emitted from blue LDs 2a and 2b. Note that, the detailed structure of phosphor wheel device 10 will be described in the later stage.

As shown in FIG. 2, heat absorber 21 is disposed inside casing unit 11 of phosphor wheel device 10. Heat absorber 21 has a fin structure through which airflow formed in light conversion device 20 passes, and absorbs heat from the airflow including heat generated in phosphor layer 16 of phosphor wheel 13. Heat absorber 21 is fixed to outer cylindrical portion 11b and bottom portion 11d with a screw. Herein, outer cylindrical portion 11b is included in casing unit 11 of phosphor wheel device 10 shown in FIG. 3. Further, as shown in FIGS. 4A and 4B, heat absorber 21 has a plurality of fins 21a, and is thermally connected to heat dissipater 22 via heat pipe 24.

A plurality of fins 21a are constituted by metal with high thermal conductivity, and radially arranged in a plan view, as shown in FIG. 4B.

Thus, the airflow entering a gap between phosphor wheel 13 and lid portion 11a through a plurality of openings 13c, which are formed through phosphor wheel 13, can be guided to the outside in a radial direction. At this time, phosphor layer 16 is provided on a face (first face) of phosphor wheel 13 that faces lid portion 11a, thereby making it possible to send the airflow to phosphor layer 16 and its vicinity, effectively. Accordingly, the heat generated in the fluorescent substance can be cooled efficiently.

Further, when the airflow passes through between the plurality of fins 21a, temperature of the airflow can be reduced because the heat contained in the airflow is transferred to a fin 21a side.

In an inner peripheral face of heat absorber 21, wall portion 21b is positioned on an outer peripheral side of blade 33b. Wall portion 21b functions as a wall portion that prevents the airflow, which is generated by blade 33b during rotation of phosphor wheel 13, from flowing into the outer peripheral side, i.e., a second face (face on an opposite side of phosphor wheel 13 from the first face on which phosphor layer 16 is provided) side.

Thus, the airflow generated by blade 33b during rotation of phosphor wheel 13 can be guided to the first face side on which phosphor layer 16 is formed through opening 13c of phosphor wheel 13, efficiently.

As shown in FIG. 2, heat dissipater 22 is disposed outside casing unit 11 of phosphor wheel device 10. As shown in FIG. 3 or other figures, heat dissipater 22 is thermally connected to heat absorber 21 via heat pipe 24. Thus, the heat of the airflow, which is absorbed in heat absorber 21, is dissipated to the outside of casing unit 11. Further, heat dissipater 22 has a fin structure including a plurality of fins 22a disposed on an outer peripheral face of heat dissipater 22.

The plurality of fins 22a, which are constituted by metal with high thermal conductivity, are arranged along a direction perpendicular to a longitudinal direction of heat pipe 24, as shown in FIGS. 4A and 4B. Thus, the heat is dissipated to the outside air from casing unit 11.

As shown in FIGS. 2 and 3, optical lens 23 is attached to an opening portion formed in lid portion 11a of casing unit 11 via optical lens holding component 23a. As shown in FIG. 1, the excitation light that excites the fluorescent substance of phosphor layer 16 of phosphor wheel 13 passes through optical lens 23. In addition to this, the light emitted from the fluorescent substance of phosphor layer 16 is converged and guided to dichroic mirror 3d by optical lens 23.

As shown in FIGS. 4A and 4B, heat pipe 24 connects heat absorber 21 and heat dissipater 22 thermally. Inside heat pipe 24, a hollow space is formed. A small amount of water is enclosed in the hollow space. When receiving heat on a heat absorber 21 side, the water evaporates and moves to a heat dissipater 22 side as vapor. The vapor that has moved to the heat dissipater 22 side is cooled and liquefied in heat dissipater 22, and then turned into water. Herein, after the vapor is cooled on the heat dissipater 22 side and turned into water, the water is moved into the hollow space due to a capillary phenomenon, and returns back to heat absorber 21.

In other words, inside heat pipe 24, the small amount of water is evaporated on the heat absorber 21 side and liquefied on the heat dissipater 22 side, i.e., functions as a cooling medium.

1-3. Structure of Phosphor Wheel Device

Figure 5:
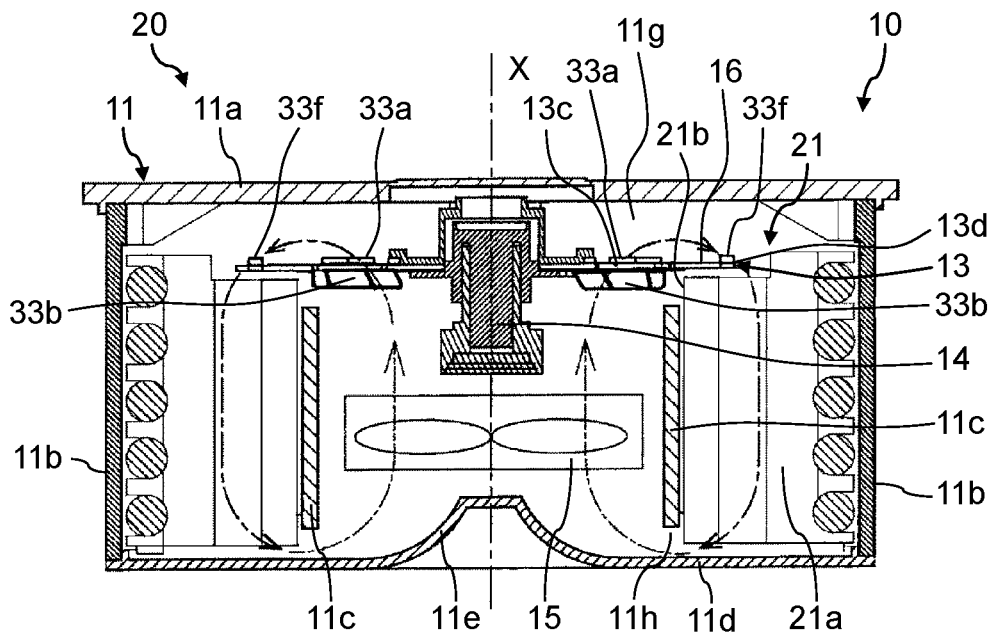
FIG. 5 is a cross-sectional view showing an inside structure of the light conversion device in FIG. 2.
Figure 6:
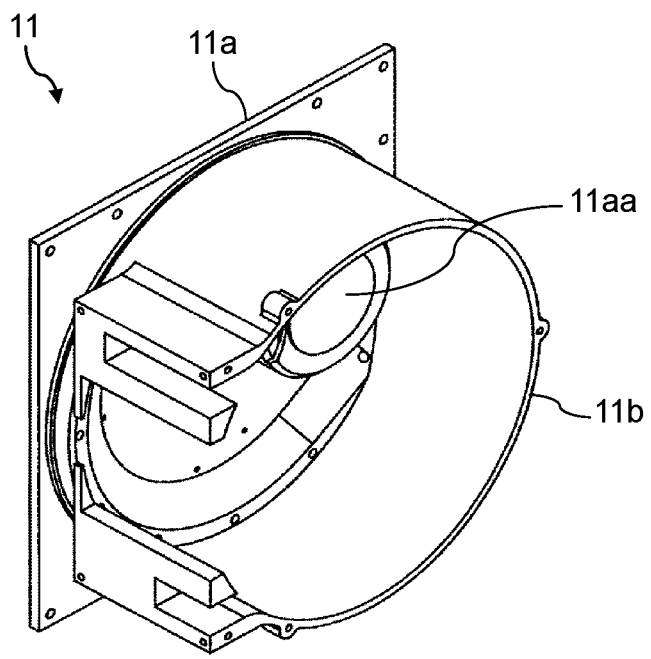
FIG. 6 is a perspective view showing a structure of a casing unit of the light conversion device in FIG. 2.

A structure of phosphor wheel device 10 will be described with reference to FIGS. 5 and 6, in addition to each of the above-mentioned figures. FIG. 5 is a cross-sectional view showing an inside structure of the light conversion device in FIG. 2. FIG. 6 is a perspective view showing a structure of a casing unit of the light conversion device in FIG. 2.

As shown in FIG. 2, phosphor wheel device 10 includes casing unit 11, phosphor wheel 13, motor 14, and pressurization fan 15.

Casing unit 11, which has a cylindrical shape (see FIG. 3), forms an enclosed space thereinside. The enclosed space accommodates phosphor wheel 13, motor 14, heat absorber 21, and the like. As shown in FIG. 5, casing unit 11 has outer cylindrical portion 11b and inner cylindrical portion 11c that are substantially-concentrically arranged. Both ends of outer cylindrical portion 11b and inner cylindrical portion 11c are communicated with each other in a direction of axis X parallel to a rotation center of phosphor wheel 13, and form a circulation path of airflow.

Furthermore, at least a portion of casing unit 11 in contact with the outside air is formed of metal. Thus, even if the inside of casing unit 11 is warmed by heat generated in a fluorescent substance portion of phosphor layer 16 of phosphor wheel 13 provided in casing unit 11, the heat can be efficiently dissipated to the outside through the above-mentioned portion of casing unit 11, which is formed of metal with high thermal conductivity. Note that, it is preferred that the above-mentioned portion of casing unit 11, which is formed of metal, functions as lid portion 11a on a phosphor wheel 13 side, for example.

As shown in FIG. 5, before entering heat absorber 21, the airflow to which the heat generated in phosphor layer 16 is transferred passes through the vicinity of lid portion 11a disposed close to phosphor layer 16 of phosphor wheel 13. Thus, even if lid portion 11a is heated by the airflow that has passed through the vicinity of phosphor layer 16 of phosphor wheel 13 and heated, the heat of lid portion 11a can be dissipated to the outside, effectively. As a result, as compared with other members (outer cylindrical portion 11b, inner cylindrical portion 11c, bottom portion 11d) that constitute casing unit 11, the heat of the airflow can be dissipated to the outside more effectively.

As shown in FIG. 3, lid portion 11a is a substantially square-plate shaped member. Further, as shown in FIG. 2, lid portion 11a is attached to casing unit 11 so as to cover a face of phosphor wheel 13 on a phosphor layer 16 side. Further, opening 11aa into which above-mentioned optical lens 23 is inserted is formed in lid portion 11a. The blue laser light and fluorescence (red, green) pass through optical lens 23.

Opening 11aa is a through hole formed to face phosphor layer 16 of phosphor wheel 13 in lid portion 11a. Optical lens 23 is attached to opening 11aa via optical lens holding component 23a.

As shown in FIGS. 3 and 6, outer cylindrical portion 11b is a substantially cylindrical shaped member that forms a side face of casing unit 11.

Inner cylindrical portion 11c is a cylindrical member that is concentrically arranged with respect to outer cylindrical portion 11b, and disposed on an inner circumferential side of outer cylindrical portion 11b. Inner cylindrical portion 11c is disposed adjacent to an inner circumferential side of heat absorber 21. Furthermore, inner cylindrical portion 11c is formed to have a dimension smaller than that of outer cylindrical portion 11b in the direction of axis X. Thus, both ends of outer cylindrical portion 11b and inner cylindrical portion 11c are communicated with each other in the direction of axis X.

As shown in FIG. 5, bottom portion 11d is attached to outer cylindrical portion 11b to cover a face on an opposite side of casing unit 11 from the face on which lid portion 11a is provided in the direction of axis X.

Updraft guide 11e is a guide member for inverting and raising the airflow that has passed through heat absorber 21 and cooled. Updraft guide 11e is provided on bottom portion 11d to project toward an inner space side of casing unit 11. Updraft guide 11e has a substantially cone shape centered on axis X. Along updraft guide 11e, the airflow that has flowed into the inner circumferential side of inner cylindrical portion 11c from the outer circumferential side thereof is guided to rise up, using wind force of pressurization fan 15.

Accordingly, the airflow generated by blades 33a and 33b, according to rotation of phosphor wheel 13, flows out from the inner circumferential side of inner cylindrical portion 11c and passes through opening 13c of phosphor wheel 13 and communicating part 11g located on a phosphor wheel 13 side. Subsequently, the airflow is guided to the outside in the radial direction, while passing through the vicinity of phosphor layer 16 of phosphor wheel 13. Then, the airflow passes through opening 13d and the peripheral portion of phosphor wheel 13, and passes through the inside of heat absorber 21 while moving downward along axis X, and then is cooled. In other words, opening 13d is a passage for sending air from the first face to the second face. The airflow, which has passed through heat absorber 21 and cooled, passes through communicating part 11h located on an opposite side of inner cylindrical portion 11c from phosphor wheel 13, and returns back to the inner circumferential side of inner cylindrical portion 11c. In this way, a circulation path of the airflow generated by blades 33a and 33b is formed in the inner space of casing unit 11 during rotation of phosphor wheel 13.

Figure 7A:
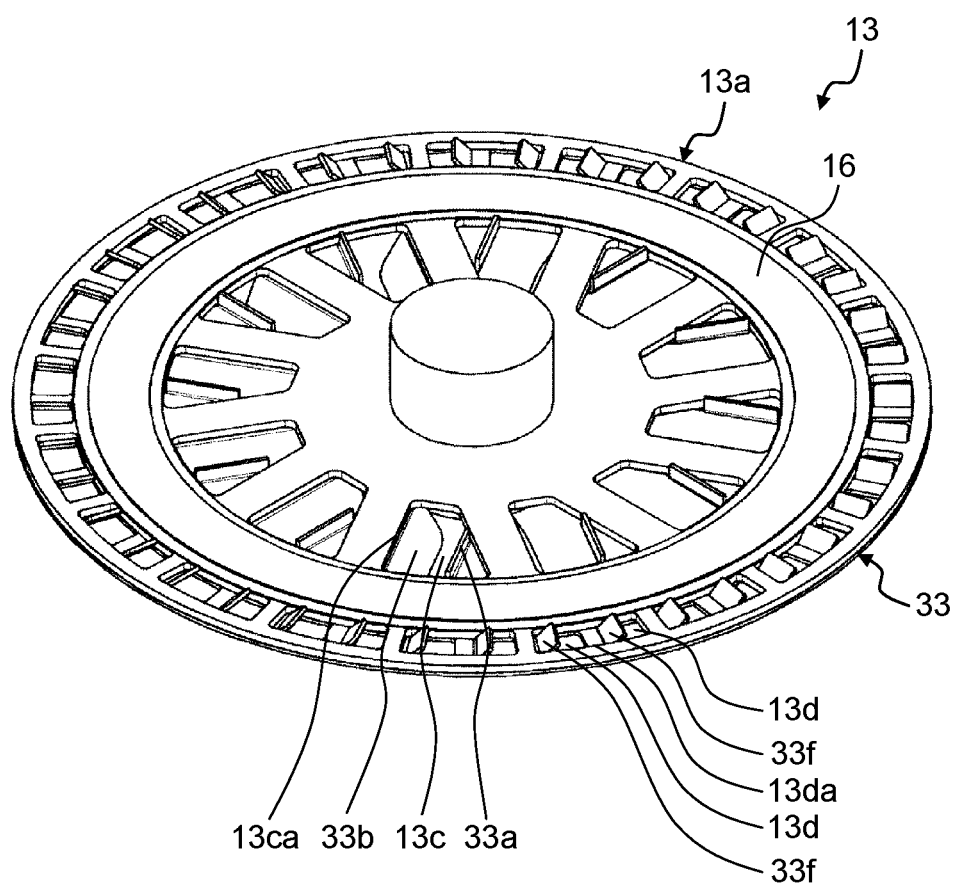
FIG. 7A is a perspective view showing a first face side of a phosphor wheel.
Figure 7B:
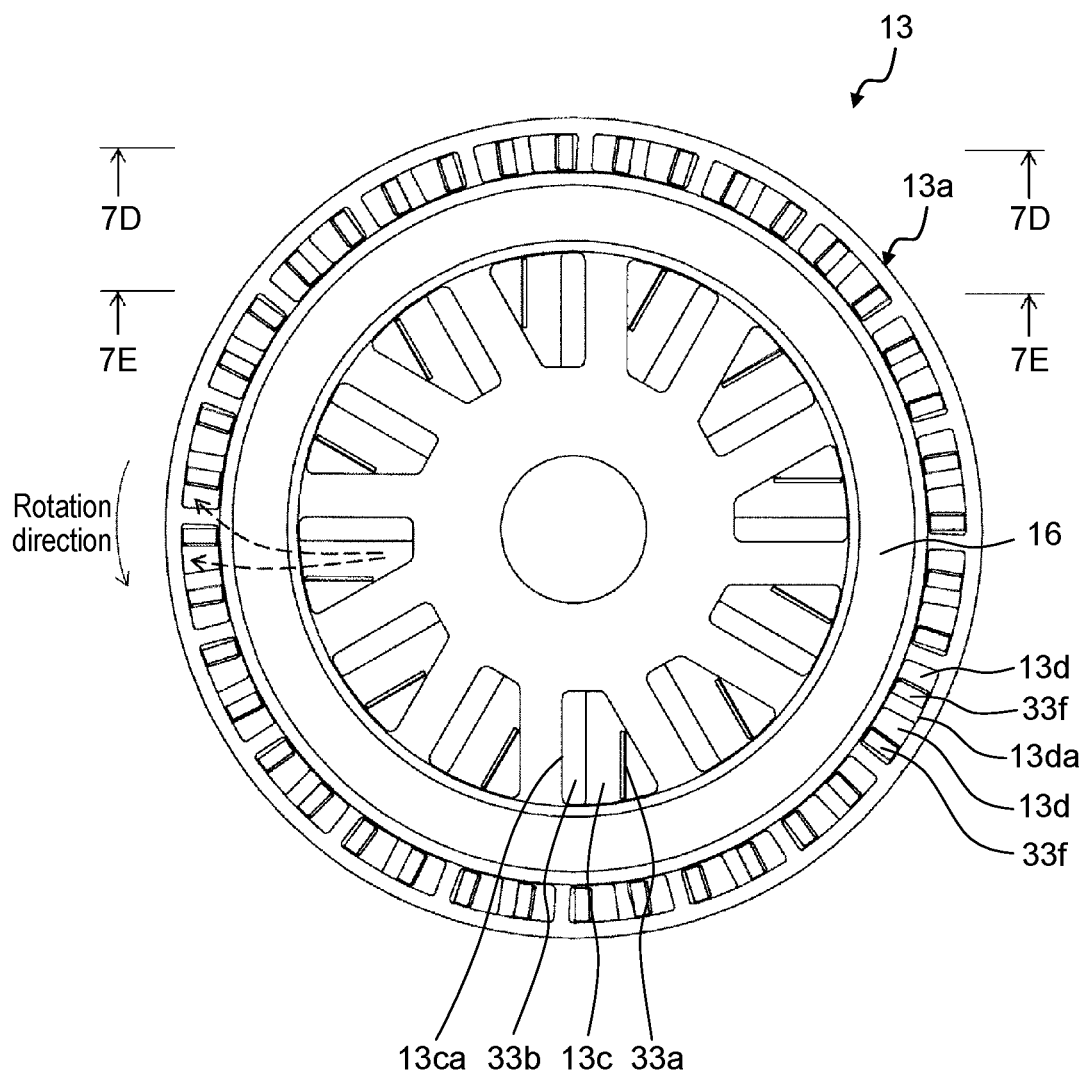
FIG. 7B is a plan view showing the first face side of the phosphor wheel.

FIG. 7A is a perspective view showing a first face side of the phosphor wheel. FIG. 7B is a plan view showing the first face side of the phosphor wheel.

As shown in FIGS. 7A and 7B, phosphor wheel 13 is a disc-shaped rotating member. Phosphor wheel 13 has phosphor layer 16, a plurality of openings 13c (an example of a second opening), a plurality of openings 13d (an example of a first opening), the same number of blades 33a as the plurality of openings 13c, the same number of blades 33b (an example of a second blade) as the plurality of openings 13c, and the same number of blades 33f (an example of a first blade) as the plurality of openings 13d.

The plurality of openings 13c, blades 33a, and blades 33b are arranged at first predetermined angular intervals in a circumferential direction about a rotation center of phosphor wheel 13 on an inner circumferential side of phosphor layer 16.

The plurality of openings 13d and blades 33f are arranged at second predetermined angular intervals in the circumferential direction about the rotation center of phosphor wheel 13 on an outer circumferential side of phosphor layer 16. The first predetermined angle and the second predetermined angle may be the same, or may be different from each other.

Figure 7C:
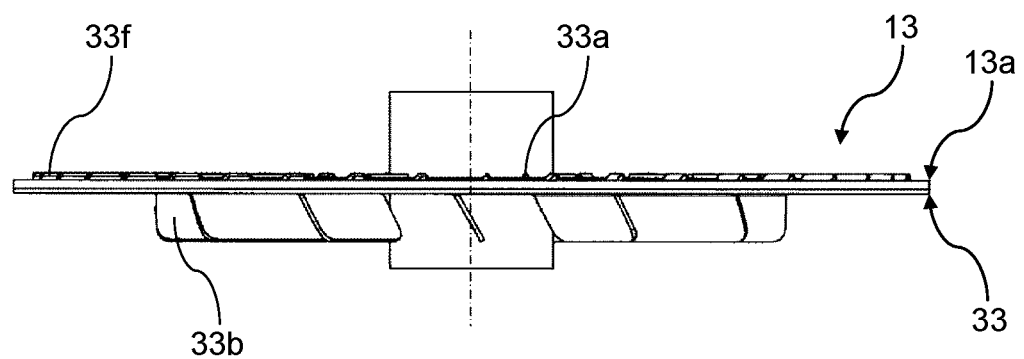
FIG. 7C is a side view of the phosphor wheel.
Figure 7D:
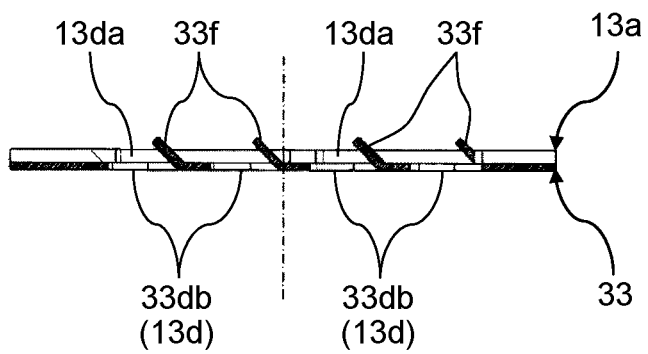
FIG. 7D is a cross-sectional view of the phosphor wheel in FIG. 7B taken along line 7D-7D.
Figure 7E:
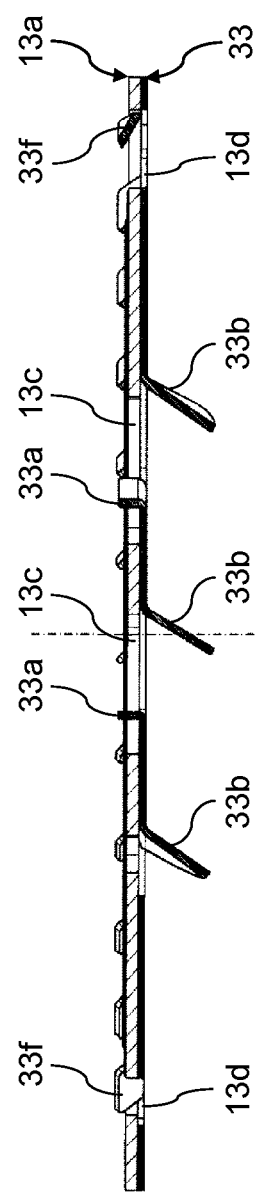
FIG. 7E is a cross-sectional view of the phosphor wheel in FIG. 7B taken along line 7E-7E.

FIG. 7C is a side view of phosphor wheel 13. FIG. 7D is a cross-sectional view of phosphor wheel 13 in FIG. 7B taken along line 7D-7D. FIG. 7E is a cross-sectional view of phosphor wheel 13 in FIG. 7B taken along line 7E-7E.

As shown in FIGS. 7C through 7E, disc-shaped substrate 13a and disc-shaped member 33 are stacked to constitute phosphor wheel 13.

Figure 7F:
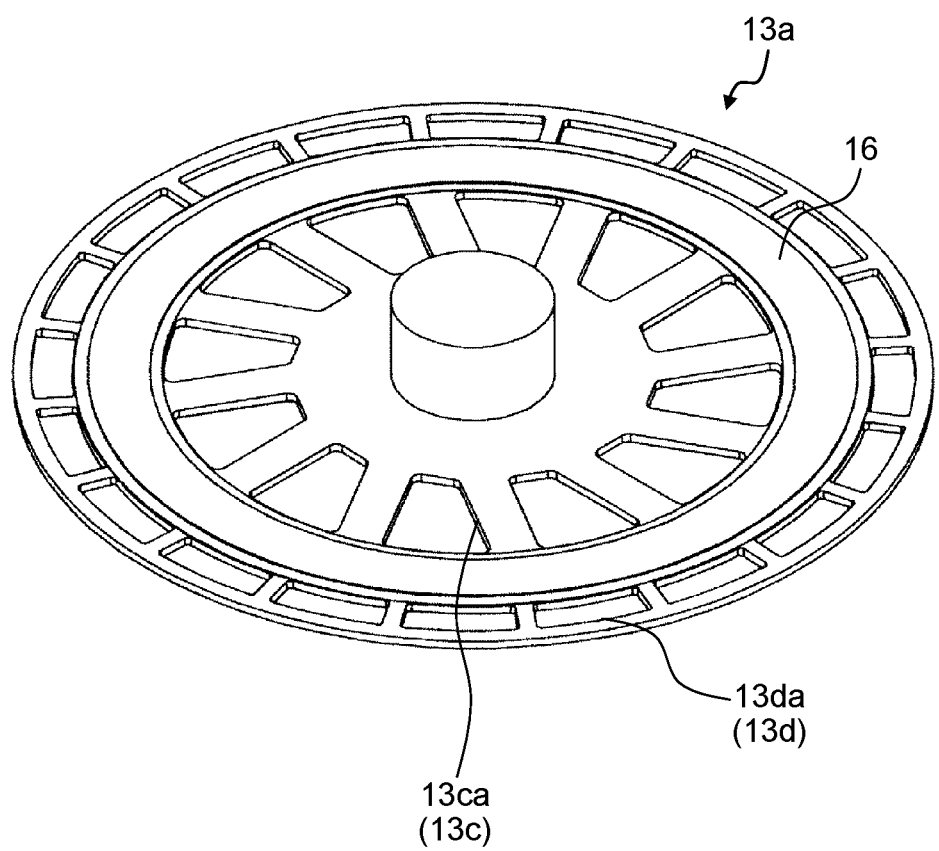
FIG. 7F is a perspective view showing an upper face side of a substrate of the phosphor wheel.
Figure 7G:
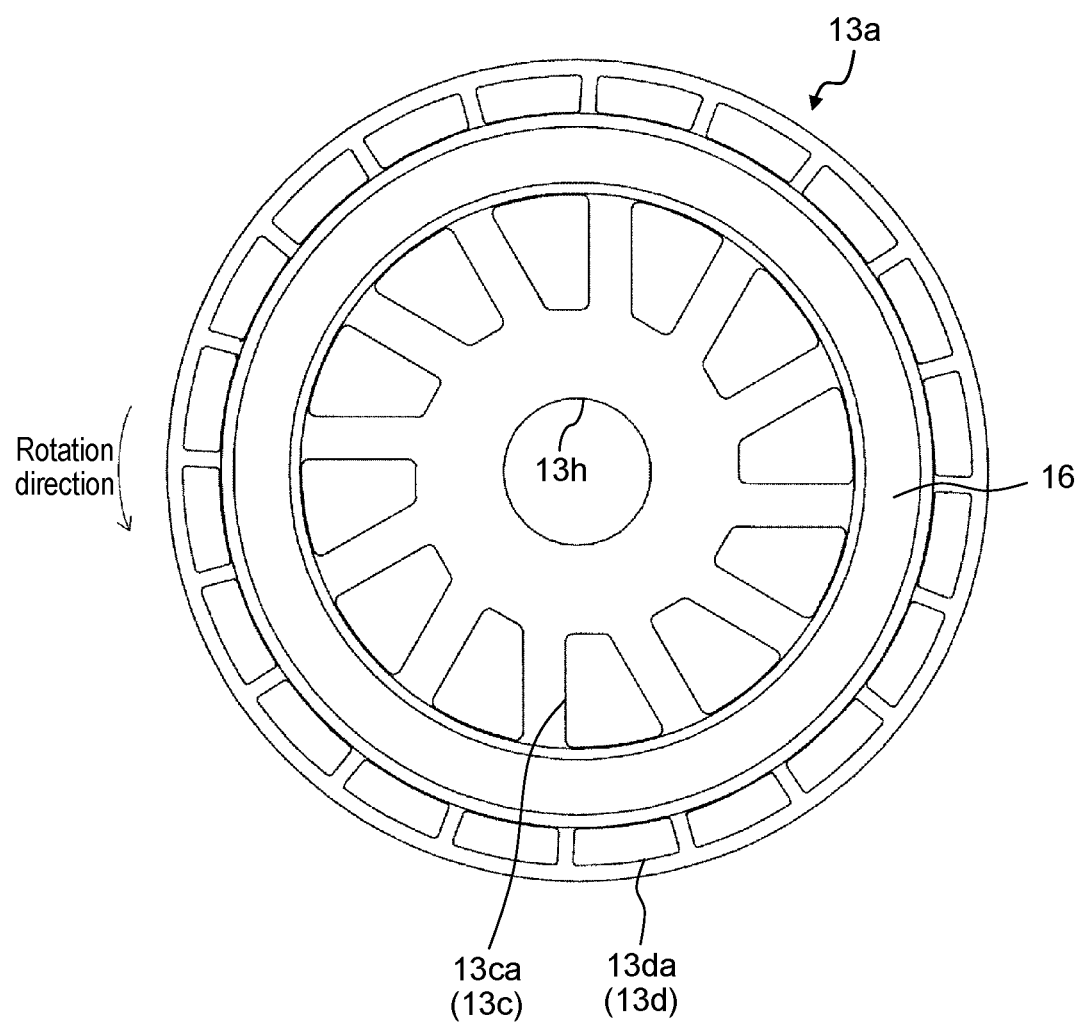
FIG. 7G is a plan view showing the upper face side of the substrate of the phosphor wheel.

FIG. 7F is a perspective view showing an upper face side of substrate 13a of phosphor wheel 13. FIG. 7G is a plan view showing the upper face side of substrate 13a of phosphor wheel 13.

As shown in FIGS. 7F and 7G, substrate 13a has center hole 13h provided at a rotation center of circular substrate 13a, phosphor layer 16, a plurality of openings 13ca, and a plurality of openings 13da.

The plurality of openings 13ca each are an opening for forming opening 13c of phosphor wheel 13 on a substrate 13a side. The plurality of openings 13ca are arranged at the above-mentioned first predetermined angular intervals in a circumferential direction about the rotation center of substrate 13a.

The plurality of openings 13da each are an opening for forming opening 13d of phosphor wheel 13 on the substrate 13a side. Note that, each of the plurality of openings 13da is larger than opening 13d (opening 33db of disc-shaped member 33 described later), and one opening 13da is provided to every two openings 13d. Accordingly, the plurality of openings 13da are arranged at double the above-mentioned second predetermined angular intervals in the circumferential direction about the rotation center of substrate 13a.

A fluorescent substance is applied annularly to form phosphor layer 16. As mentioned above, phosphor layer 16 converts the blue laser lights emitted from blue LDs 2a and 2b into red light and green light, and emits the red light and green light from phosphor wheel 13.

Figure 7H:
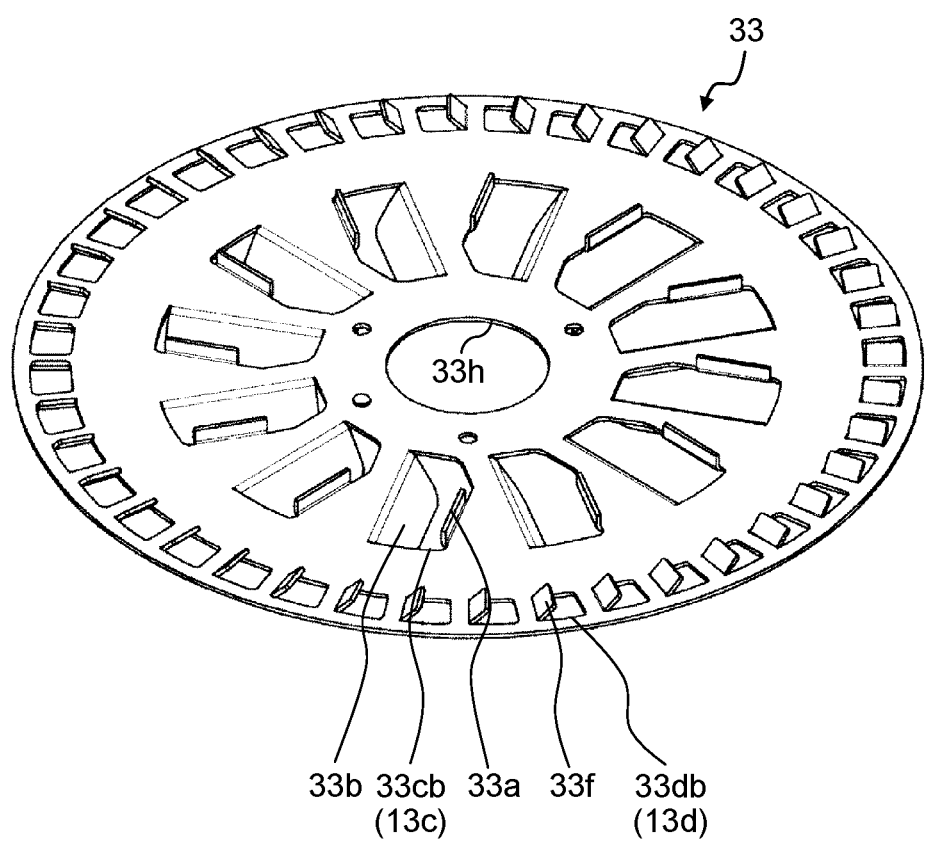
FIG. 7H is a perspective view showing an upper face side of a disc-shaped member of the phosphor wheel.
Figure 7I:
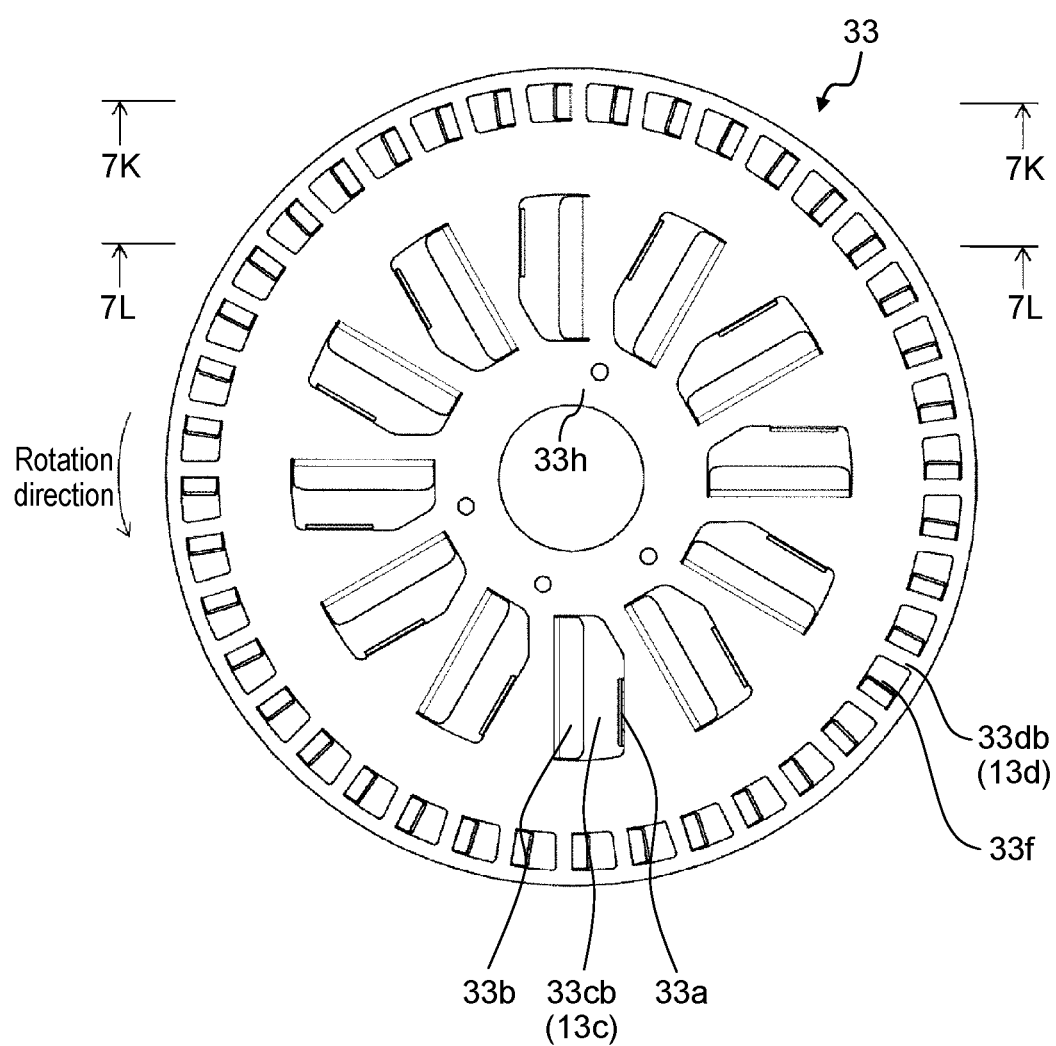
FIG. 7I is a plan view showing the upper face side of the disc-shaped member of the phosphor wheel.
Figure 7J:
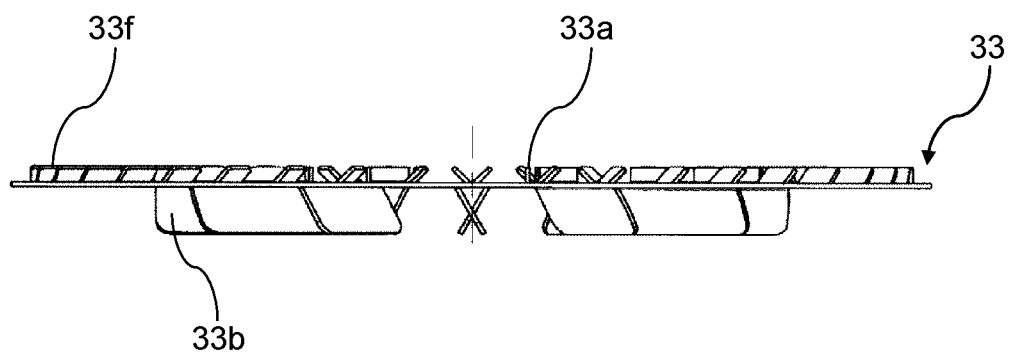
FIG. 7J is a side view of the disc-shaped member of the phosphor wheel.
Figure 7K:
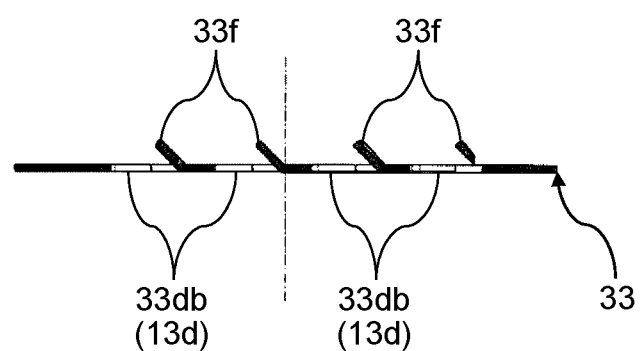
FIG. 7K is a cross-sectional view of the disc-shaped member in FIG. 7I taken along line 7K-7K.
Figure 7L:
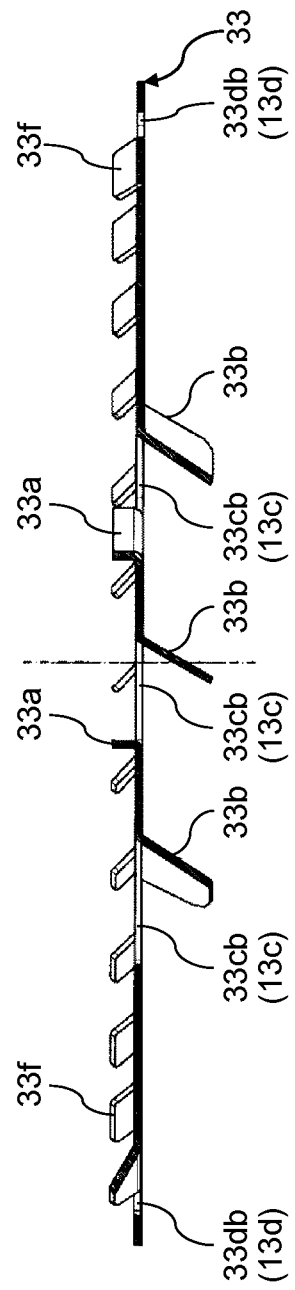
FIG. 7L is a cross-sectional view of the disc-shaped member in FIG. 7I taken along line 7L-7L.
Figure 7M:
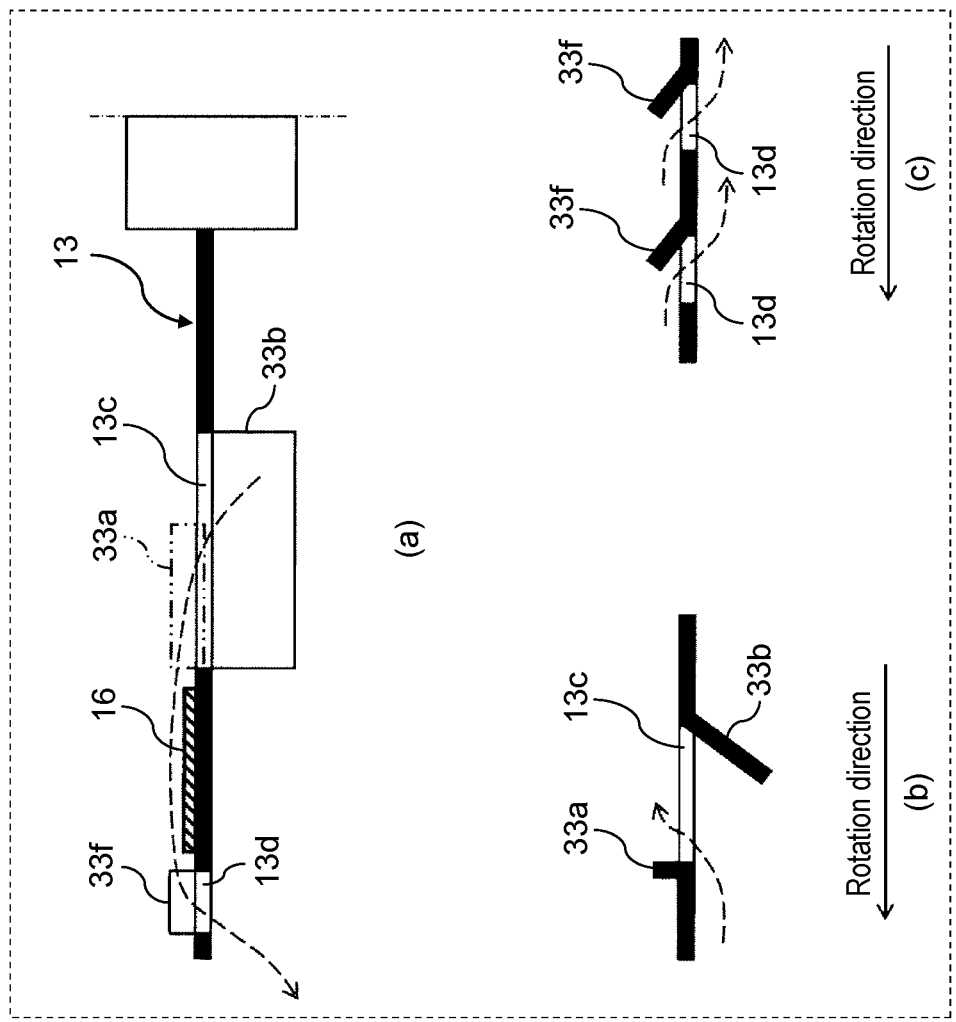
FIG. 7M is a view schematically showing a path of airflow near the phosphor wheel.

FIG. 7H is a perspective view showing an upper face side of disc-shaped member 33 of phosphor wheel 13. FIG. 7I is a plan view showing the upper face side of disc-shaped member 33 of phosphor wheel 13. FIG. 7J is a side view of disc-shaped member 33 of phosphor wheel 13. FIG. 7K is a cross-sectional view of disc-shaped member 33 in FIG. 7I taken along line 7K-7K. FIG. 7L is a cross-sectional view of disc-shaped member 33 in FIG. 7I taken along line 7L-7L. FIG. 7M is a view schematically showing a path of airflow near phosphor wheel 13. In (a) of FIG. 7M, a cross-section of phosphor wheel 13 taken along a radial direction is shown. In (b) of FIG. 7M, there is shown a cross-section of a portion at which opening 13c and blades 33a and 33b are provided in phosphor wheel 13 taken along a circumferential direction. In (c) of FIG. 7M, there is shown a cross-section of a portion at which opening 13d and blade 33f are provided in phosphor wheel 13 taken along a circumferential direction. Note that, in phosphor wheel 13 of FIG. 7M, disc-shaped member 33 and substrate 13a are collectively illustrated as one member.

As shown in FIGS. 7H through 7J, disc-shaped member 33 has center hole 33h provided at the rotation center of circular disc-shaped member 33, a plurality of openings 33cb, a plurality of openings 33db, the same number of blades 33a and 33b as the plurality of openings 33cb, and the same number of blades 33f as the plurality of openings 33db.

The plurality of openings 33cb each are an opening for forming opening 13c of phosphor wheel 13 on a disc-shaped member 33 side. The plurality of openings 33cb are arranged at the above-mentioned first predetermined angular intervals in a circumferential direction about the rotation center of disc-shaped member 33.

The plurality of openings 33db each are an opening for forming opening 13d of phosphor wheel 13 on the disc-shaped member 33 side. The plurality of openings 33db are arranged at the above-mentioned second predetermined angular intervals in the circumferential direction about the rotation center of disc-shaped member 33.

As shown in FIGS. 7I and 7L, blade 33a is provided to extend upward from a front-side edge in a rotation direction of opening 33cb. Further, blade 33a is elongated in a radial direction along the front-side edge in the rotation direction of opening 33cb.

As shown in FIGS. 7I and 7L, blade 33b is provided to extend obliquely downward from a rear-side edge in the rotation direction of opening 33cb toward a front side in the rotation direction of opening 33cb. Further, blade 33b is elongated in the radial direction along the rear-side edge in the rotation direction of opening 33cb.

As shown in FIGS. 7I and 7M, blade 33f is provided to extend obliquely upward from a rear-side edge in a rotation direction of opening 33db toward a front side in the rotation direction of opening 33db. Further, blade 33f is elongated in the radial direction along the rear-side edge in the rotation direction of opening 33db.

Herein, disc-shaped member 33 is mode of aluminum, for example. Openings 33cb and 33db are formed by cutting into disc-shaped member 33. Blades 33a, 33b, and 33f are formed by cutting and raising a sheet of disc-shaped member 33 made of aluminum. More specifically, blade 33a is formed by bending, to the upper face side, a portion obtained by cutting into disc-shaped member 33 to form opening 33cb. Blade 33b is formed by bending, to the lower face side, the portion obtained by cutting into disc-shaped member 33 to form opening 33cb. Blade 33f is formed by bending, to the upper face side, a portion obtained by cutting into disc-shaped member 33 to form opening 33db.

Disc-shaped member 33 is stacked on disc-shaped substrate 13a such that center hole 33h is aligned with center hole 13h of disc-shaped substrate 13a, thereby making it possible to align disc-shaped member 33 with substrate 13a. Further, disc-shaped member 33 is stacked on substrate 13a such that blades 33a and 33f are inserted into openings 13ca and 13da on the substrate 13a side, thereby also making it possible to align disc-shaped member 33 with substrate 13a in the circumferential direction.

Disk-shaped member 33 and substrate 13a, which are stacked on each other, are sandwiched by a predetermined fixed member from upper and lower sides in the axial direction.

According to phosphor wheel 13 with the above-mentioned structure, when phosphor wheel 13 is driven to rotate, airflow is generated in casing unit 11 to flow upward in the axial direction by pressurization fan 15 and blade 33b integrated with phosphor wheel 13, as shown in FIG. 5.

In the present exemplary embodiment, opening 13c is formed to correspond to blade 33b in phosphor wheel 13. Therefore, the airflow generated by blade 33b is sent, through opening 13c, to the first face side of phosphor wheel 13 on which phosphor layer 16 is formed, and further sent to the phosphor-layer 16 side by blade 33a.

Further, in the enclosed space formed in casing unit 11, after being heated near phosphor layer 16 of phosphor wheel 13, the airflow generated by blade 33b passes through heat absorber 21 disposed in a space between outer cylindrical portion 11b and inner cylindrical portion 11c.

At this time, heat exchange is performed between the heated air and the small amount of water enclosed into heat pipe 24 connected to heat absorber 21, so that the air is cooled. After that, the cooled air moves to the inner circumferential side of inner cylindrical portion 11c, and is sent out toward the phosphor layer 16 side of phosphor wheel 13 through opening 13c.

Thus, as shown in FIG. 7M, the airflow that is generated by blade 33b and flows along the axial direction passes through opening 13c, and is guided to the first face side on which phosphor layer 16 is provided, and then moved outward in the radial direction by blade 33a.

Herein, motor 14 for driving to rotate phosphor wheel 13 is disposed on a path of the airflow cooled by heat absorber 21, as shown in FIG. 5. Accordingly, even if heat is generated in motor 14 by continuous rotation of phosphor wheel 13, the cooling air can cool motor 14 effectively.

Further, pressurization fan 15 is disposed within a circulation path of airflow, which is formed in casing unit 11, and sends air along a direction of airflow in the circulation path. In other words, as shown in FIG. 5, pressurization fan 15 is disposed to send air along a direction of airflow generated by blade 33b. Further, pressurization fan 15 is disposed between phosphor wheel 13 and updraft guide 11e in casing unit 11. In other words, in a circulation path of the airflow that is generated by blade 33b and flows along the axial direction, pressurization fan 15 is disposed on the most downstream side. This makes it possible to strengthen airflow on the most downstream side, because the airflow generated by blade 33b is most weakened on the most downstream side. As a result, the speed of airflow is increased near phosphor layer 16 of phosphor wheel 13, motor 14, or the like, which is a place where a large amount of heat is generated in casing unit 11, so that the cooling effect is more improved.

As mentioned above, blade 33a is located on the face (first face) on which phosphor layer 16 is provided, i.e., the face located on an opposite side to blade 33b, and provided to be adjacent to opening 13c and extend along the radial direction. As shown in FIG. 5, to dissipate the heat generated in casing unit 11 when the fluorescent substance of phosphor layer 16 of phosphor wheel 13 is excited, blade 33a forms airflow flowing outward in the radial direction.

In more detail, blade 33a guides airflow such that the airflow flows outward in in the radial direction. Herein, the airflow is generated by blade 33b and above-mentioned pressurization fan 15, flows along the axial direction, passes through the plurality of openings 13c formed in phosphor wheel 13, and moves to the face side on which phosphor layer 16 is provided.

Thus, if the speed of airflow is increased near the surface of phosphor layer 16 of phosphor wheel 13, the cooling effect will be more improved than before, effectively.

Further, as shown in FIG. 2, blade 33a is located on the face on which phosphor layer 16 is provide so as to face optical lens 23, and disposed close to optical lens 23. Accordingly, the height of blade 33a is determined such that blade 33a does not tough optical lens 23. Therefore, in the present exemplary embodiment, even if optical lens 23 is disposed close to the face on which phosphor layer 16 is provided, cooling effect of phosphor layer 16 can be improved.

1-4. Circulation of Airflow Generated by Blade

As mentioned above, in the present exemplary embodiment, blades 33a and 33f and blade 33b are formed integrally with each other and rotated due to rotation of phosphor wheel 13, thereby generating airflow in casing unit 11. Herein, blades 33a and 33f are provided on the first face side of phosphor wheel 13 mounted on phosphor wheel device 10, and blade 33b is provided on the second face side.

In other words, the airflow generated by blade 33b is formed to flow upward in FIG. 5, and passes through opening 13c of phosphor wheel 13, as shown in a FIG. 5.

Note that, although the airflow formed by blade 33b is likely to flow outward in the radial direction due to centrifugal force or the like, wall portion 21b of heat absorber 21 prevents the airflow from flowing outward in the radial direction. Now, wall portion 21b is disposed close to blade 33b on an outer peripheral side of blade 33b in the radial direction. This prevents the air from flowing to the outer peripheral side of blade 33b in the radial direction, so that the airflow can be guided to opening 13c efficiently.

The airflow that has passed through opening 13c of phosphor wheel 13 is sent outward in the radial direction about axis X by blade 33a.

At this time, when passing through near the surface of phosphor layer 16, the airflow moving along phosphor layer 16 of phosphor wheel 13 is heated by heat of the fluorescent substance.

The airflow heated by the fluorescent substance passes through opening 13d of phosphor wheel 13, moves downward in FIG. 5, and passes through a gap between fins 21a of heat absorber 21.

At this time, heat absorber 21 absorbs heat from the heated airflow, and cools it.

The airflow cooled in heat absorber 21 moves along a face of bottom portion 11d from a lower end of heat absorber 21 in the direction of axis X, and is guided to a phosphor wheel 13 side along updraft guide 11e.

At this time, as shown in FIG. 5, the airflow rising up along updraft guide 11e is accelerated and moved by pressurization fan 15.

The airflow accelerated by pressurization fan 15 flows through near motor 14 and cools motor 14, and then moves to the second face of phosphor wheel 13 again. As mentioned above, the airflow that has moved to the second face of phosphor wheel 13 is moved to the face on a phosphor layer 16 side through opening 13c by blade 33b. This makes it possible to cool the heat generated in the fluorescent substance of phosphor layer 16 of phosphor wheel 13, constantly.

Herein, to cool the heat generated in phosphor layer 16 of phosphor wheel 13 efficiently, a fan is usually provided such that air hits the front of phosphor layer 16 directly. In such a structure, however, the arrangement of a fan may make it difficult to secure a space for accommodating optical lens 23, which is disposed close to phosphor layer 16 of phosphor wheel 13, as shown in FIG. 7L. Alternatively, an apparatus is likely to be enlarged.

In phosphor wheel device 10 of the present exemplary embodiment and light conversion device 20 including the same, blades 33a, 33b, and 33f for forming the airflow to cool phosphor layer 16 of phosphor wheel 13 each are provided on the face on which phosphor layer 16 of phosphor wheel 13 is provided or a face on an opposite side to the face on which phosphor layer 16 is provided, as mentioned above. Furthermore, in the present exemplary embodiment, to guide the airflow generated by blade 33b to the phosphor layer 16 side on which blade 33a is provided, opening 13c is provided so as to correspond to blade 33b of phosphor wheel 13.

Accordingly, the space for accommodating optical lens 23 can be secured on the phosphor layer 16 side of phosphor wheel 13. Addition to this, the airflow passing through near phosphor layer 16 can be formed by blades 33a and 33f provided on the first face side of phosphor layer 16.

Especially, in the present exemplary embodiment, blade 33f is provided close to the outer circumference of phosphor layer 16, and formed such that blade 33f extends forwardly and upwardly in the rotation direction from the first face. Thus, the air that has passed through phosphor layer 16 and flowed to the outer circumferential side is drawn to the second face side of phosphor wheel 13. This makes it easier to cause the air to flow through near the surface of phosphor layer 16 at high speed, as shown in FIG. 7M. Therefore, the heat generated in phosphor layer 16 can be absorbed effectively.

According to the present exemplary embodiment that has the above-mentioned structure, blades 33a, 33b, and 33f, and optical lens 23 can be accommodated together without enlarging an apparatus. In addition to this, heat generated in a fluorescent substance of phosphor layer 16 can be cooled effectively.

2. Effect

Phosphor wheel 13 of the present exemplary embodiment includes a first face that has phosphor layer 16, a second face located on an opposite side to the first face, blade 33f (first blade) provided to project from the first face, and opening 13d (passage, first opening) provided to pass through phosphor wheel 13 between the first face and the second face. Blade 33f is provided to send air on a second face side to the first face side through opening 13d during rotation of phosphor wheel 13.

This makes it possible to dissipate heat generated in a fluorescent substance of phosphor layer 16 to the second face side opposite to the first face side. Therefore, cooling performance of phosphor wheel 13 is improved.

Phosphor wheel 13 of the present exemplary embodiment further includes opening 13c (second opening) provided to pass through phosphor wheel 13 between the first face and the second face, and blade 33b (second blade) provided to project from the second face. Blade 33b is provided to send cooling air, which is supplied to the second face side, to the first face side through opening 13c during rotation of phosphor wheel 13.

This makes it possible to send cooling air to the first face side on which phosphor layer 16, which generates heat, is provided. Therefore, cooling performance of phosphor wheel 13 is more improved.

In phosphor wheel 13 of the present exemplary embodiment, phosphor layer 16 has an annular shape centered on rotation axis X of phosphor wheel 13, and opening 13d (first opening) and opening 13c (second opening) are disposed to sandwich phosphor layer 16 in the radial direction of the phosphor wheel 13.

Thus, the cooling air, which is sent to the first face side through opening 13c, approaches phosphor layer 16 and passes through above phosphor layer 16, and then the air is discharged to the second face side through opening 13d. Accordingly, phosphor layer 16 can be cooled efficiently. Therefore, cooling performance of phosphor wheel 13 is more improved.

In phosphor wheel 13 of the present exemplary embodiment, opening 13d (first opening) is disposed on an outer circumferential side of phosphor layer 16, and opening 13c (second opening) is disposed on an inner circumferential side of phosphor layer 16.

Thus, the cooling air, which is sent to the first face side through opening 13c, automatically flows toward opening 13d disposed on the outer circumferential side due to centrifugal force caused by rotation of phosphor wheel 13. Therefore, cooling performance of phosphor wheel 13 is more improved.

The present disclosure further provides a phosphor wheel including the phosphor wheel in the present disclosure, a phosphor wheel device including the same, a light conversion device, and a projection display apparatus.

In the above-mentioned description, the first exemplary embodiment of the phosphor wheel in the present disclosure has been described. In the following, second to eighth exemplary embodiments will be described as a variation of the phosphor wheel in the present disclosure. Note that, in description of the second to eighth exemplary embodiments, the same reference numerals are assigned to components having a similar function.

Second Exemplary Embodiment

Figure 8A:
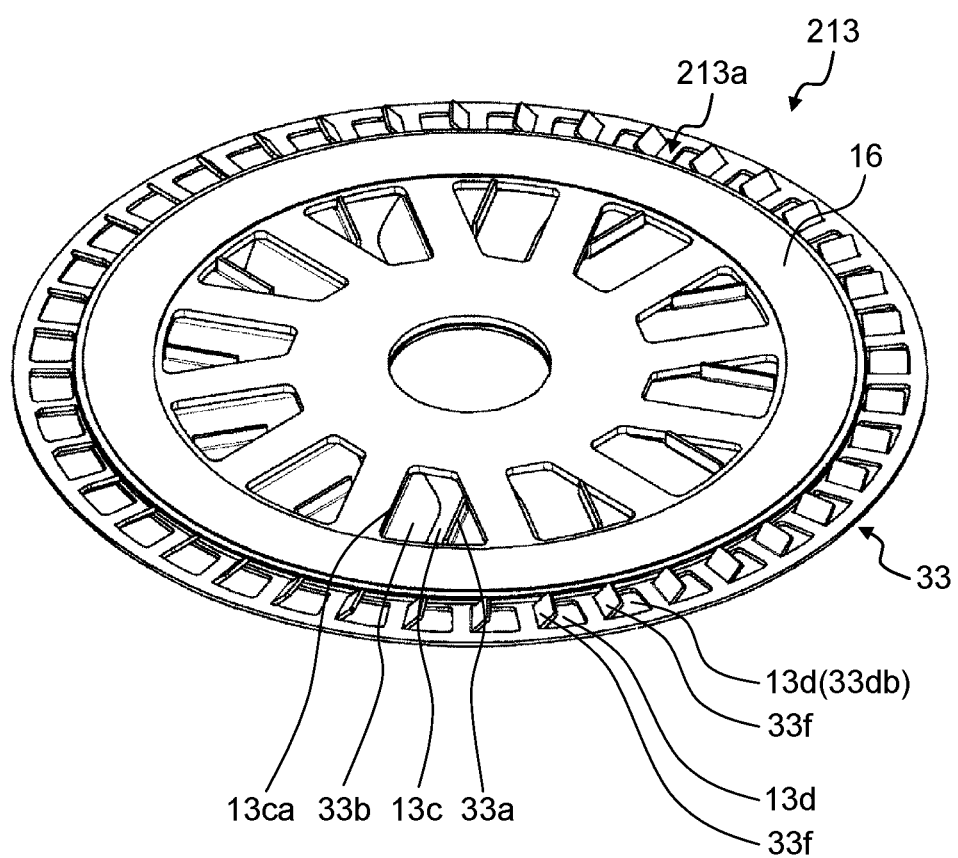
FIG. 8A is a perspective view showing a first face side of a phosphor wheel in a second exemplary embodiment.
Figure 8B:
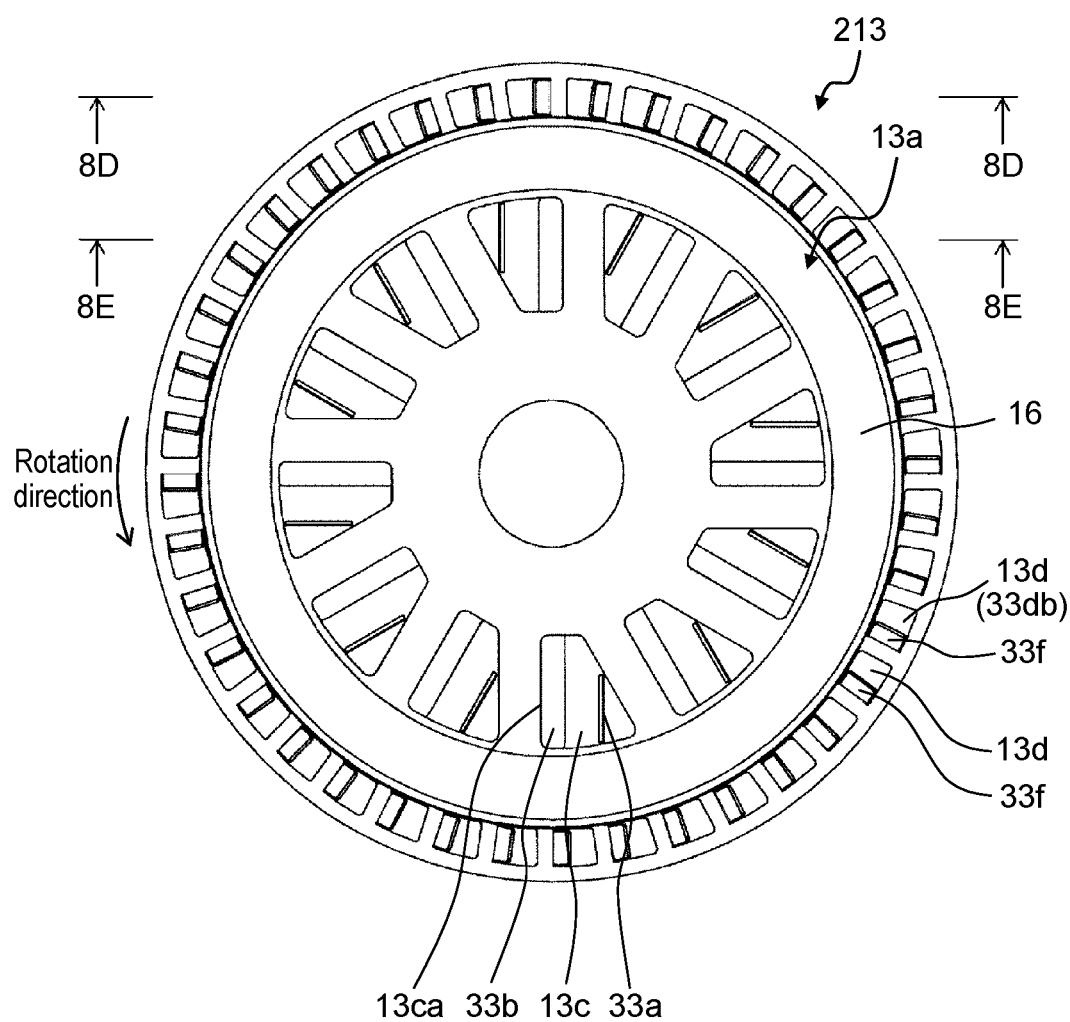
FIG. 8B is a plan view showing the first face side of the phosphor wheel.
Figure 8C:
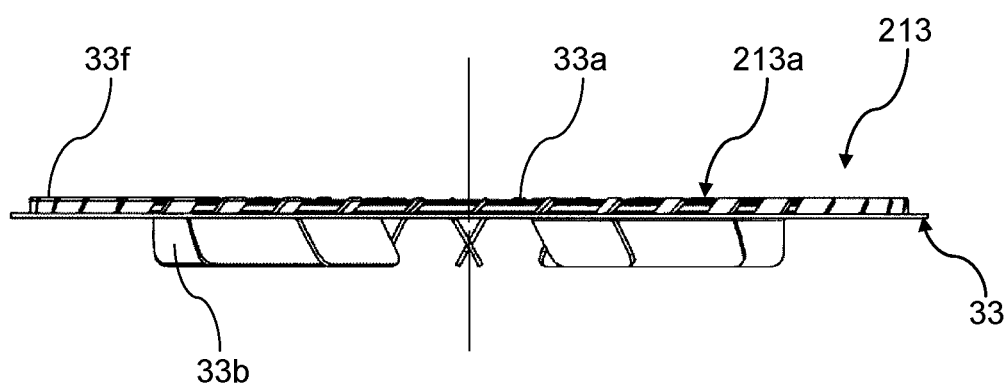
FIG. 8C is a side view of the phosphor wheel.
Figure 8D:
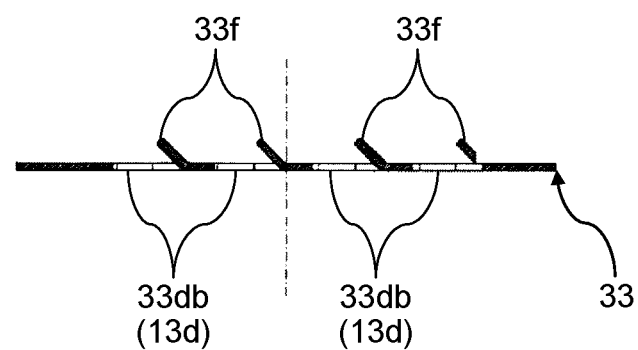
FIG. 8D is a cross-sectional view of the phosphor wheel in FIG. 8B taken along line 8D-8D.
Figure 8E:
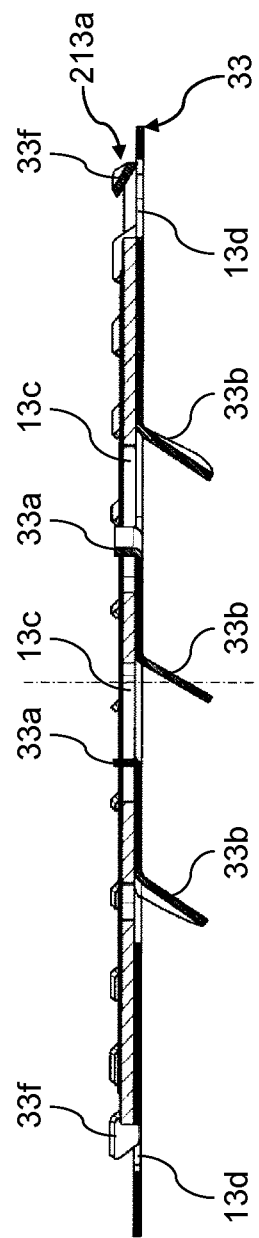
FIG. 8E is a cross-sectional view of the phosphor wheel in FIG. 8B taken along line 8E-8E.
Figure 8F:
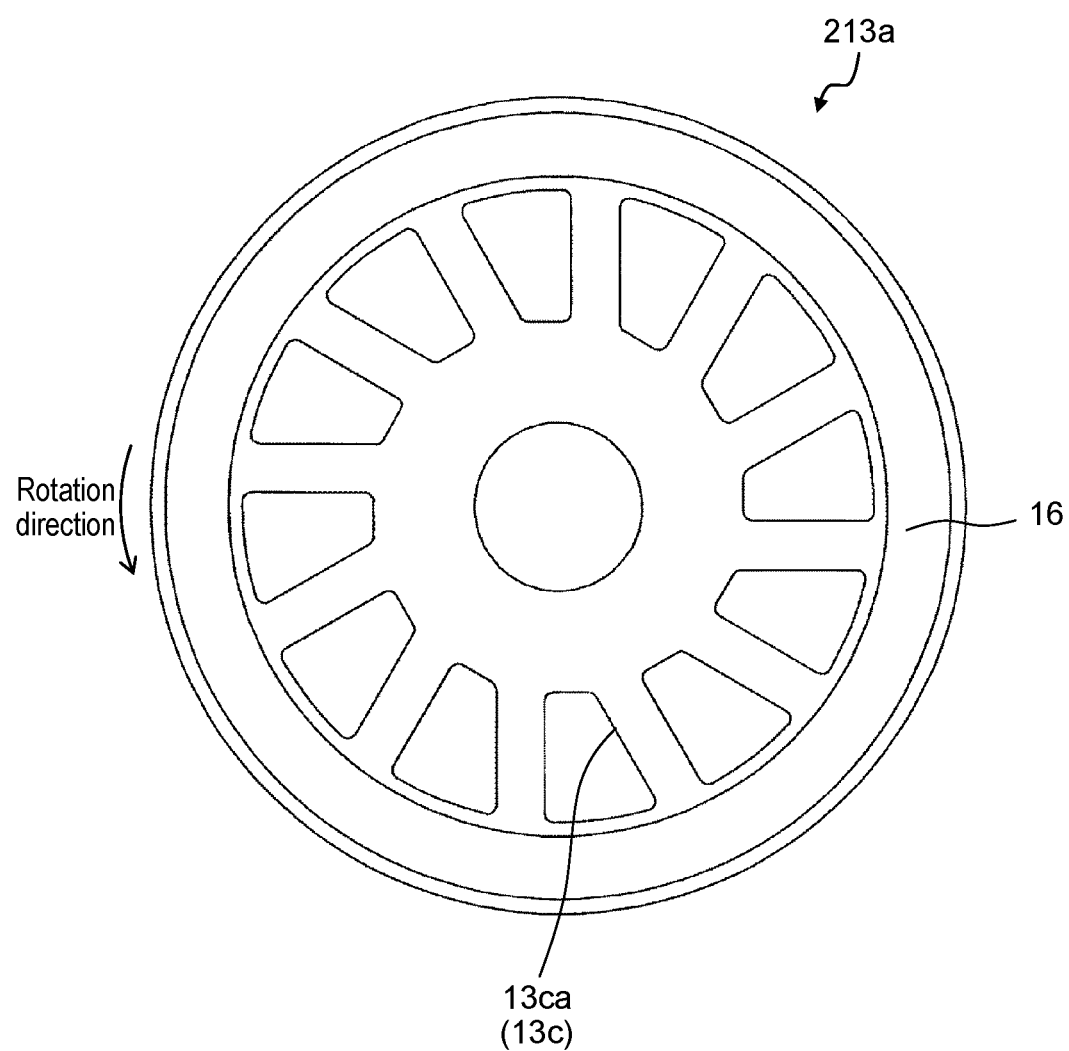
FIG. 8F is a plan view showing an upper face side of a substrate of the phosphor wheel.

A second exemplary embodiment will be described with reference to FIGS. 8A through 8F. FIG. 8A is a perspective view showing a first face side of a phosphor wheel in the second exemplary embodiment. FIG. 8B is a plan view showing the first face side of the phosphor wheel. FIG. 8C is a side view of the phosphor wheel. FIG. 8D is a cross-sectional view of the phosphor wheel in FIG. 8B taken along line 8D-8D. FIG. 8E is a cross-sectional view of the phosphor wheel in FIG. 8B taken along line 8E-8E. FIG. 8F is a plan view showing an upper face side of a substrate of the phosphor wheel.

In phosphor wheel 13 of the first exemplary embodiment, as described in FIGS. 7A through 7G, substrate 13a expands up to the outer circumferential side of phosphor layer 16, and an annular portion on the outer circumferential side is provided with opening 13da into which blade 33f of disc-shaped member 33 is fitted. On the other hand, in phosphor wheel 213 of the second exemplary embodiment, as shown in FIG. 8F, substrate 213a has no annular portion and openings on the outer circumferential side of phosphor layer 16. Note that, in the present exemplary embodiment, disc-shaped member 33 in the first exemplary embodiment, shown in FIG. 7H or the like, is employed as a disc-shaped member. Substrate 213a in FIG. 8F and disc-shaped member 33 in the first exemplary embodiment, shown in FIG. 7H or the like, are combined to obtain phosphor wheel 213 of the second exemplary embodiment, which is shown in FIGS. 8A through 8E. As shown in FIGS. 8A through 8E, phosphor wheel 213 in the present exemplary embodiment does not have substrate 213a on an upper face side of an outer circumferential portion of disc-shaped member 33, and opening 33db and blade 33f of disc-shaped member 33 are exposed to the outside.

Such a structure makes it possible to generate the same airflow as in the first exemplary embodiment described in FIG. 7M, while simplifying the structure of substrate 213a. Further, the same cooling effect as in the first exemplary embodiment is obtained.

Third Exemplary Embodiment

Figure 9A:
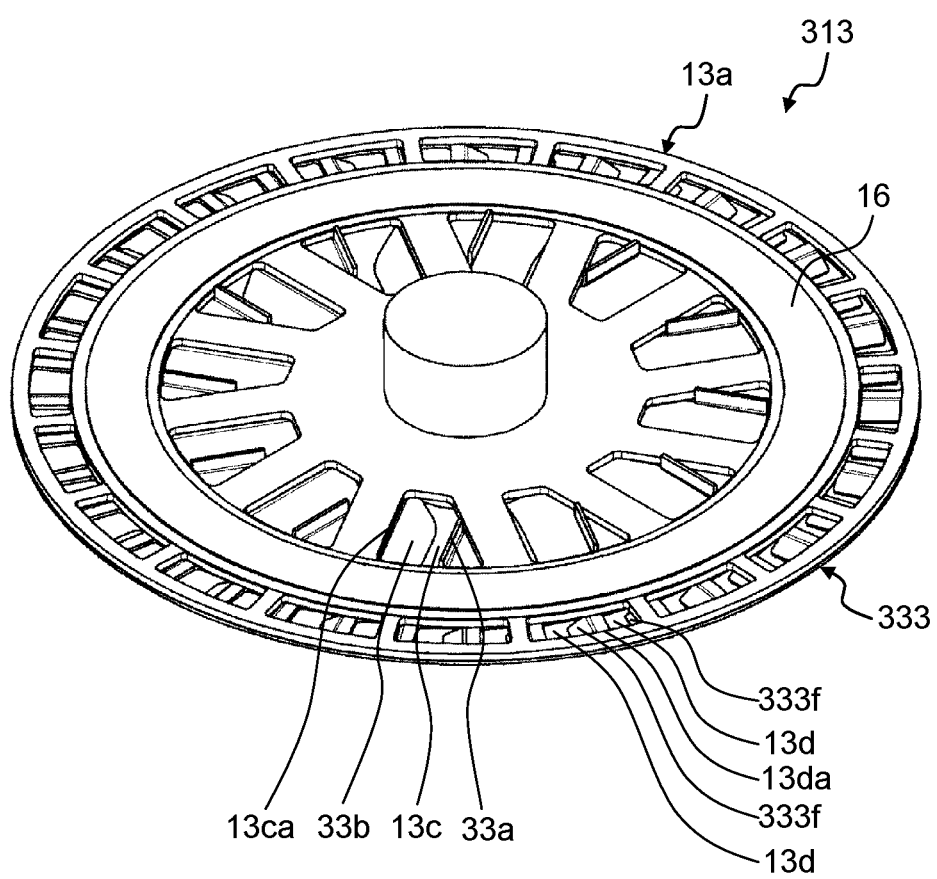
FIG. 9A is a perspective view showing a first face side of a phosphor wheel in a third exemplary embodiment.
Figure 9B:
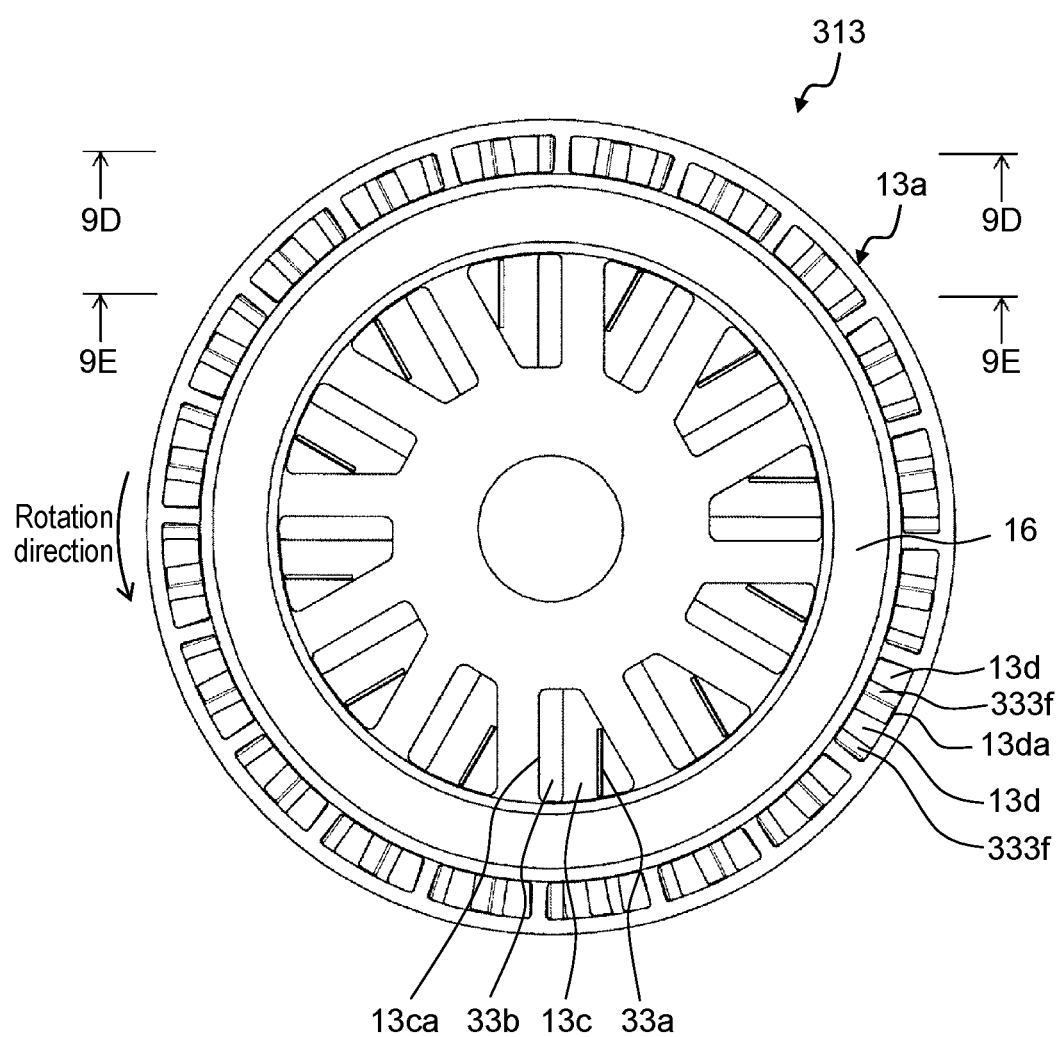
FIG. 9B is a plan view showing the first face side of the phosphor wheel.
Figure 9C:
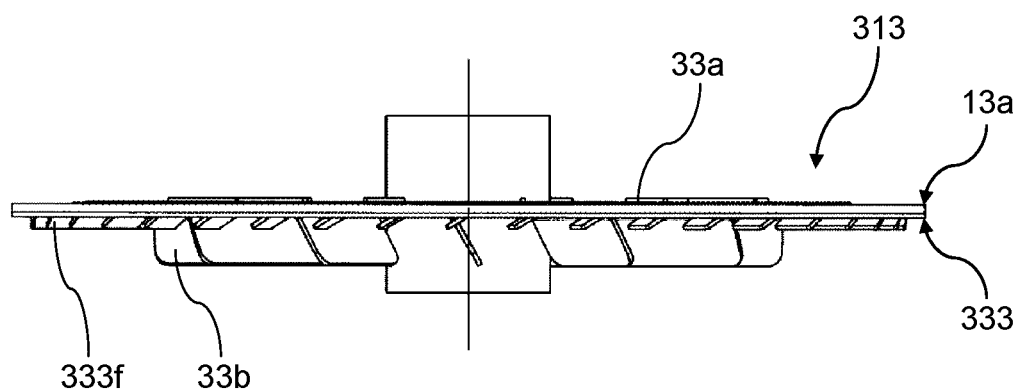
FIG. 9C is a side view of the phosphor wheel.
Figure 9D:
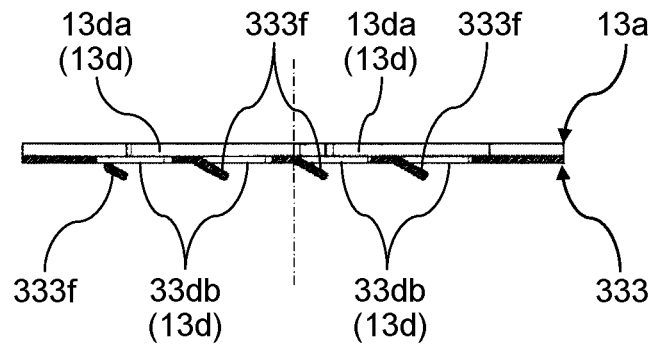
FIG. 9D is a cross-sectional view of the phosphor wheel in FIG. 9B taken along line 9D-9D.
Figure 9E:
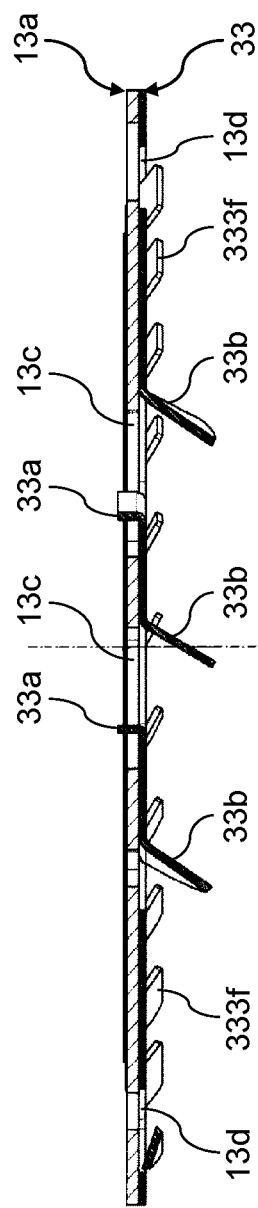
FIG. 9E is a cross-sectional view of the phosphor wheel in FIG. 9B taken along line 9E-9E.
Figure 9F:
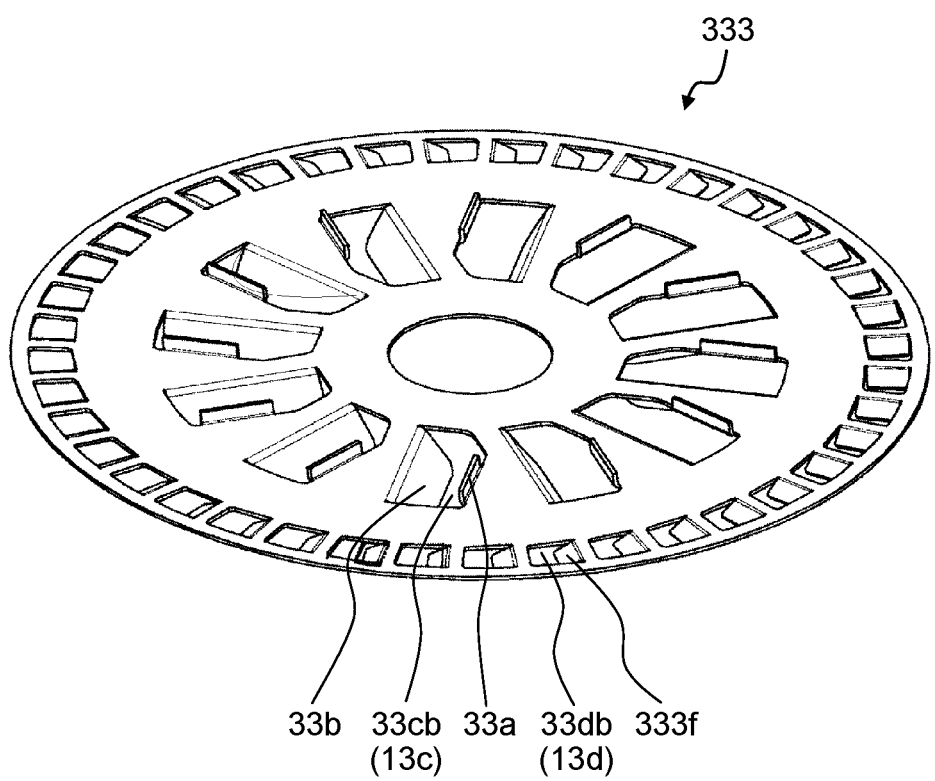
FIG. 9F is a perspective view showing an upper face side of a disc-shaped member of the phosphor wheel.
Figure 9G:
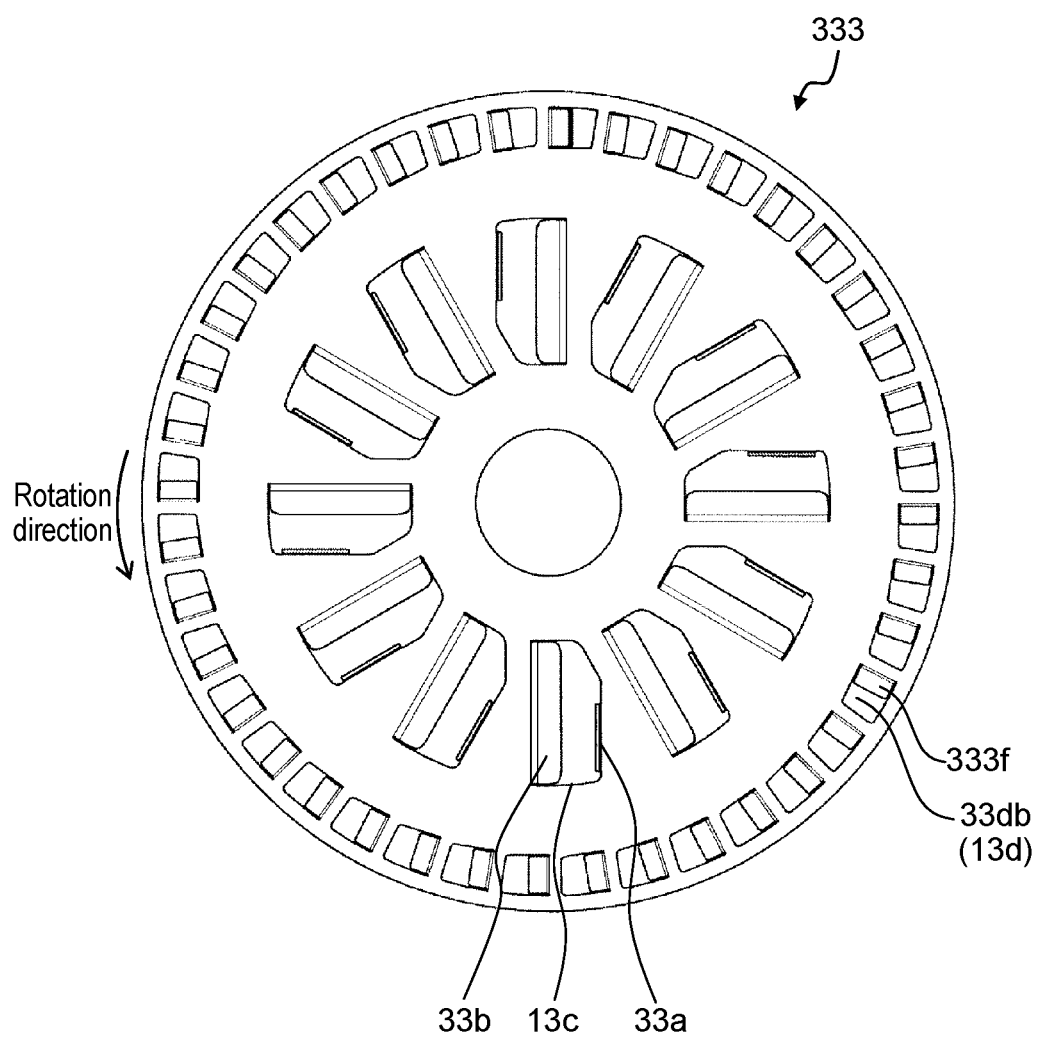
FIG. 9G is a plan view showing the upper face side of the disc-shaped member of the phosphor wheel.
Figure 9H:
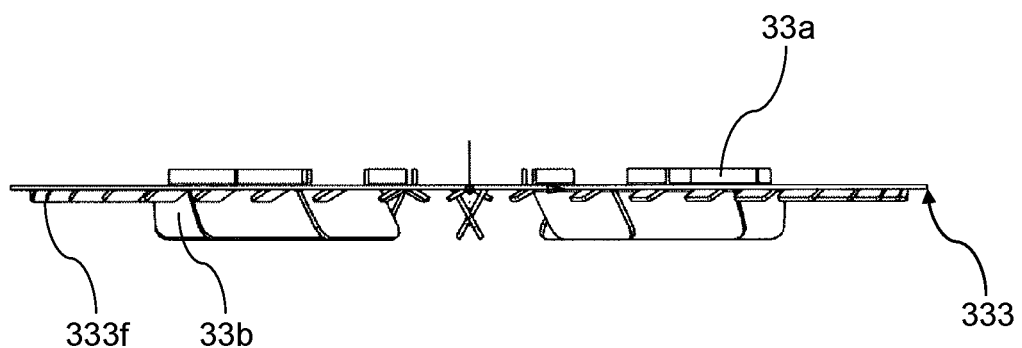
FIG. 9H is a side view of the disc-shaped member of the phosphor wheel.
Figure 9I:
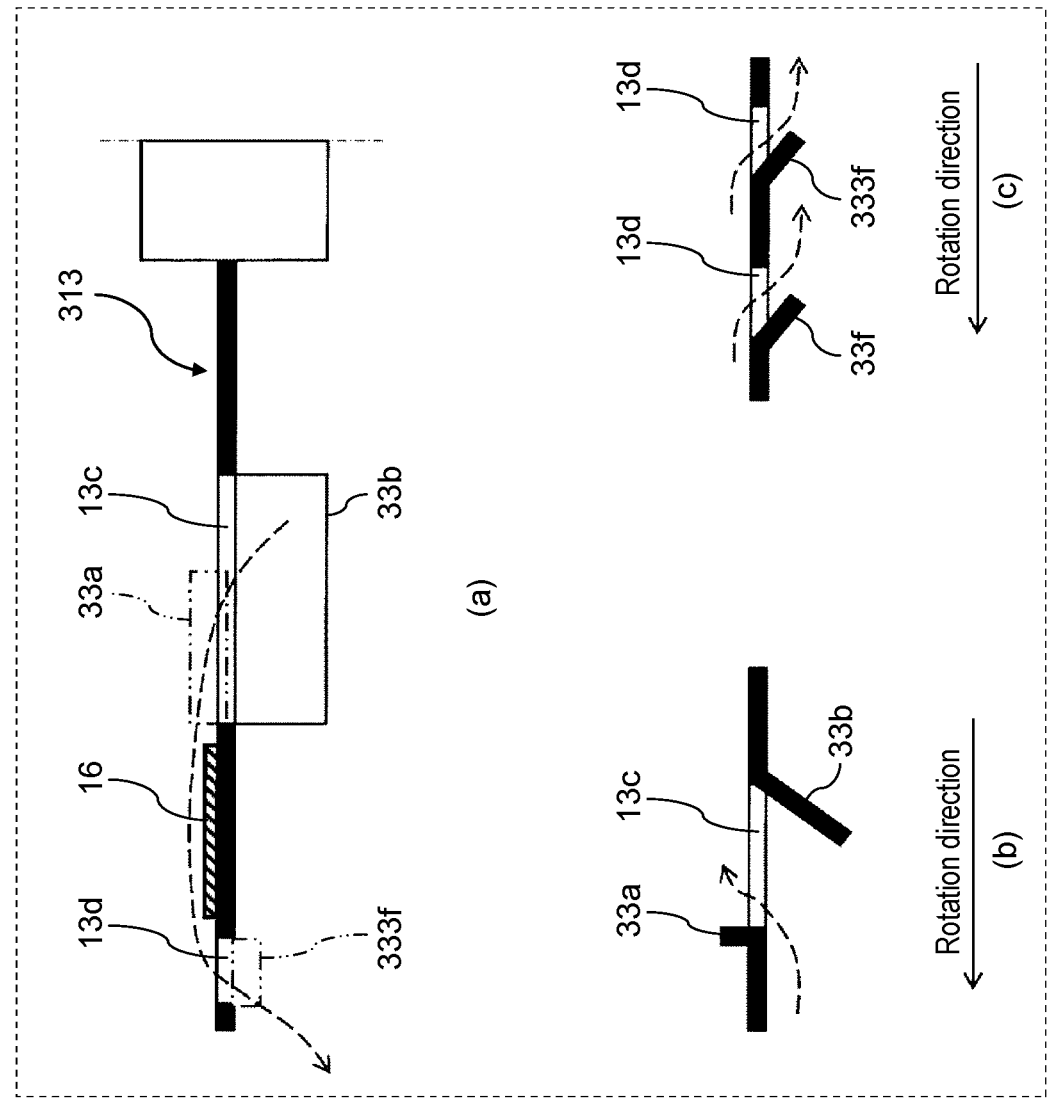
FIG. 9I is a view schematically showing a path of airflow near the phosphor wheel.

A third exemplary embodiment will be described with reference to FIGS. 9A through 9I. FIG. 9A is a perspective view showing a first face side of a phosphor wheel in the third exemplary embodiment. FIG. 9B is a plan view showing the first face side of the phosphor wheel. FIG. 9C is a side view of the phosphor wheel. FIG. 9D is a cross-sectional view of the phosphor wheel in FIG. 9B taken along line 9D-9D. FIG. 9E is a cross-sectional view of the phosphor wheel in FIG. 9B taken along line 9E-9E. FIG. 9F is a perspective view showing an upper face side of disc-shaped member 333 of the phosphor wheel. FIG. 9G is a plan view showing the upper face side of the disc-shaped member of the phosphor wheel. FIG. 9H is a side view of the disc-shaped member of the phosphor wheel. FIG. 9I is a view schematically showing a path of airflow near the phosphor wheel. In (a) of FIG. 9I, a cross-section of the phosphor wheel taken along a radial direction is shown. In (b) of FIG. 9I, there is shown a cross-section of a portion in which opening 13c and blades 33a and 33b are provided in the phosphor wheel taken along a circumferential direction. In (c) of FIG. 9I, there is shown a cross-section of a portion in which opening 13d and blades 333f are provided in the phosphor wheel taken along a circumferential direction. Note that, in phosphor wheel 313 in FIG. 9, a disc-shaped member and a substrate are collectively illustrated as one member.

In phosphor wheel 13 of the first exemplary embodiment, as described in FIGS. 7A through 7G, blade 33f of disc-shaped member 33 is provided to project from the first face (upper face). On the other hand, in phosphor wheel 313 in the third exemplary embodiment, disc-shaped member 333 has blade 333f that is provided to project to a lower face side, as shown in FIGS. 9F through 9H. Specifically, blade 333f is extended rearwardly and downwardly from a front end in the rotation direction of opening 13d. Note that, in the present exemplary embodiment, substrate 13a in the first exemplary embodiment, shown in FIGS. 7F, 7G, and the like, is employed as a substrate. Disc-shaped member 333 in FIGS. 9F through 9H and substrate 13a in the first exemplary embodiment, shown in FIGS. 7F, 7G, and the like, are combined to obtain phosphor wheel 313 of the third exemplary embodiment, which is sown in FIGS. 9A through 9E. As shown in FIGS. 9A through 9E, in phosphor wheel 313 of the present exemplary embodiment, blade 333f of disc-shaped member 333 is projected from the second face (lower face) of phosphor wheel 313.

According to the above-mentioned structure, as shown in FIG. 9I, the air pressure on a rear side in the rotation direction of blade 333f is more decreased than that of the surrounding area of the rear side during rotation of phosphor wheel 313. Thus, the air on the first face side (upper face side) flows into the second face side (lower face side) through opening 13d. This makes it possible to generate airflow similar to that described in FIG. 7M of the first exemplary embodiment. Therefore, the same cooling effect as in the first exemplary embodiment can be obtained.

In other words, phosphor wheel 313 of the present exemplary embodiment includes a first face that has phosphor layer 16, a second face located on an opposite side to the first face, blade 333f (first blade) provided to project from the second face, and opening 13d (passage, first opening) provided to pass through phosphor wheel 313 between the first face and the second face. Blade 333f is provided to send the air on the first face side to the second face side through opening 13d during rotation of phosphor wheel 313. This makes it possible to dissipate the heat generated in a fluorescent substance of a phosphor layer on the first face side to a second face side on an opposite side to the first face. Therefore, the cooling performance of phosphor wheel 13 is improved.

Note that, as mentioned above, blade 333f is formed to project from the second face, and differs from blade 33f of phosphor wheel 13 in the first exemplary embodiment, which projects from the first face. Further, blade 33b, which corresponds to the second blade, may also be formed to project from the first face, rather than from the second face. Specifically, the second blade is formed to extend rearwardly and upwardly from a front end in the rotation direction of opening 13c. Thus, during rotation of the phosphor wheel, the air pressure on the rear side of the second blade is more decreased than that of the surrounding area of the rear side, so that the air on the second face flows into the first face side through opening 13c. In this case, although being formed in a front end in the rotation direction of opening 13c in the first to third exemplary embodiments, blade 33a is formed in a rear end in the rotation direction of opening 13c to send the air, which flows into the first face side, to above phosphor layer 16 as a guide.

Fourth Exemplary Embodiment

Figure 10A:
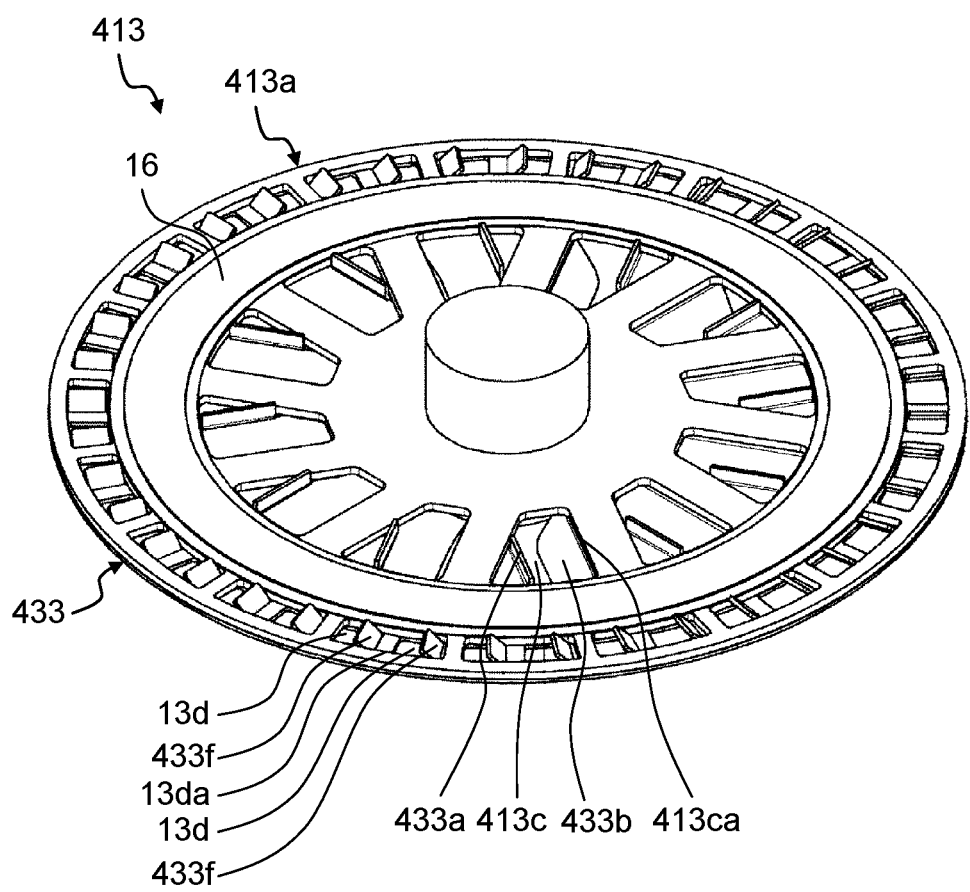
FIG. 10A is a perspective view showing a first face side of a phosphor wheel in a fourth exemplary embodiment.
Figure 10B:
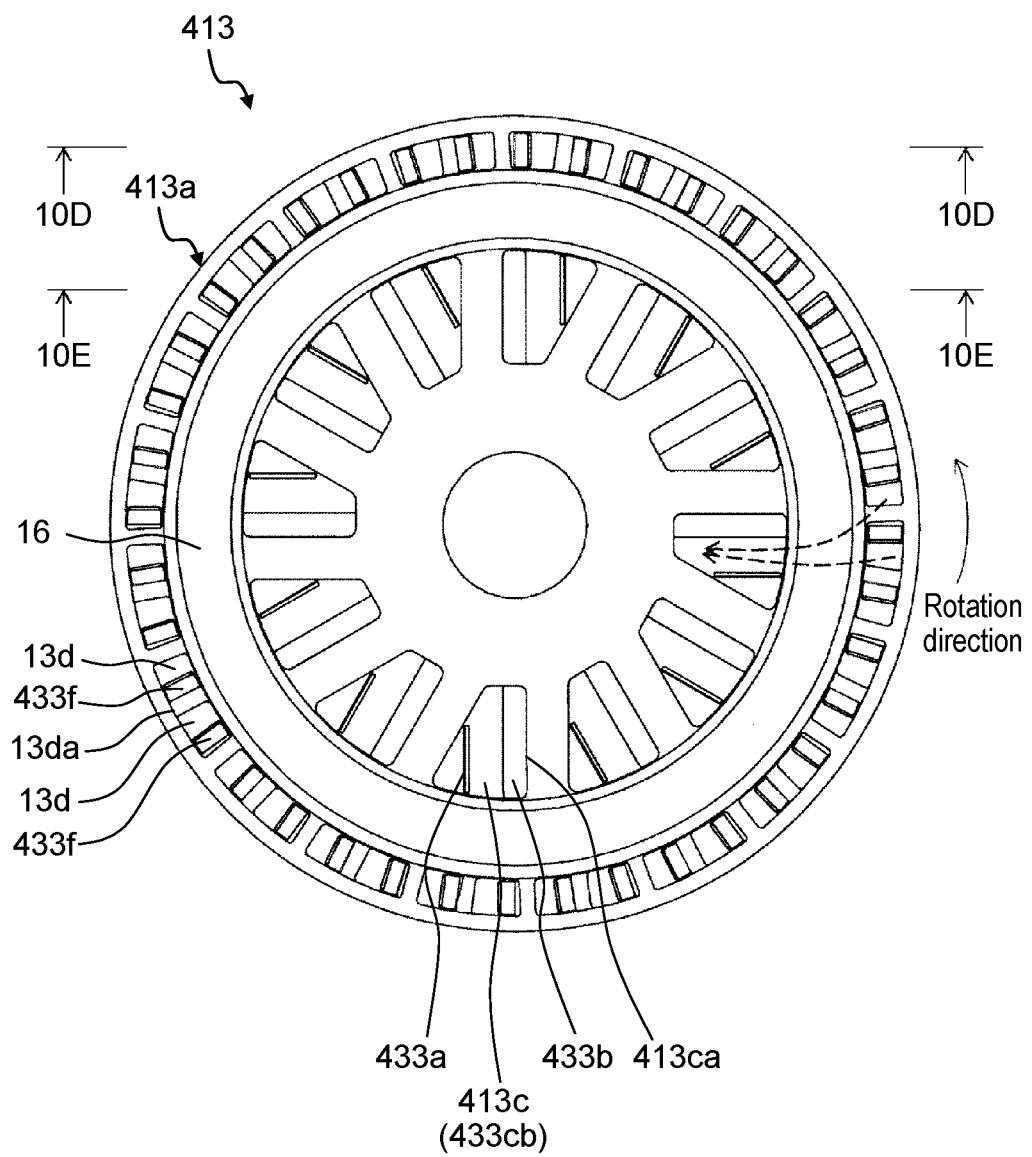
FIG. 10B is a plan view showing the first face side of the phosphor wheel.
Figure 10C:
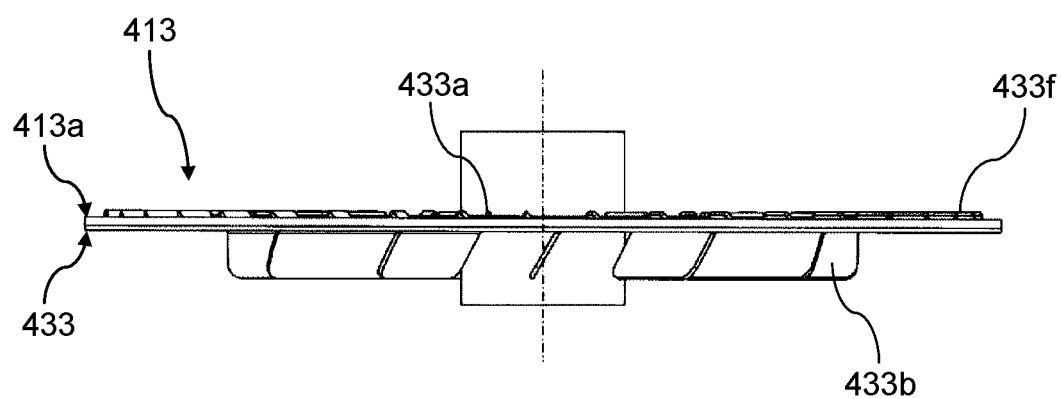
FIG. 10C is a side view of the phosphor wheel.
Figure 10D:
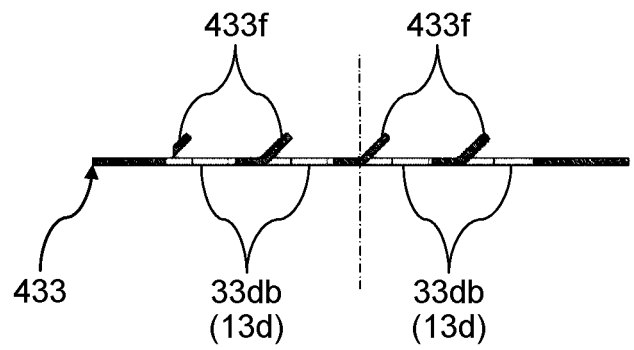
FIG. 10D is a cross-sectional view of the phosphor wheel in FIG. 10B taken along line 10D-10D.
Figure 10E:
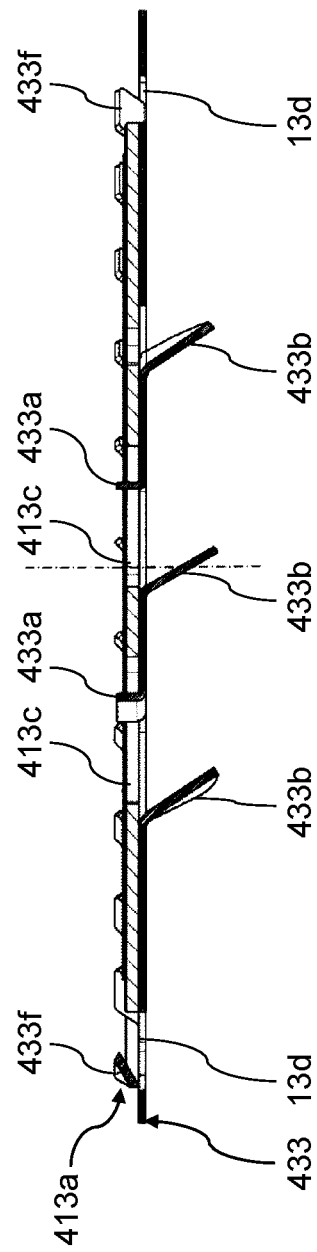
FIG. 10E is a cross-sectional view of the phosphor wheel in FIG. 10B taken along line 10E-10E.
Figure 10F:
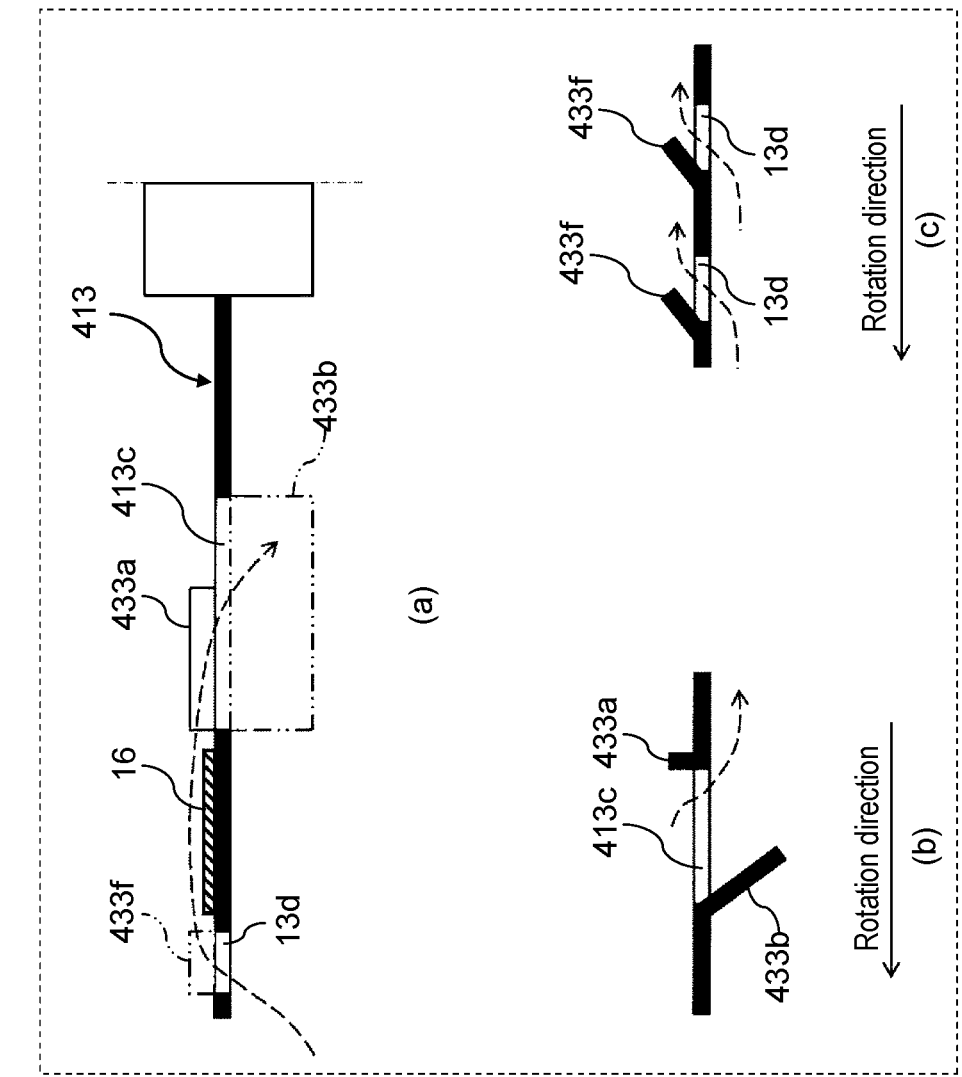
FIG. 10F is a view schematically showing a path of airflow near the phosphor wheel.

A fourth exemplary embodiment will be described with reference to FIGS. 10A through 10F. FIG. 10A is a perspective view showing a first face side of a phosphor wheel in the fourth exemplary embodiment. FIG. 10B is a plan view showing the first face side of the phosphor wheel. FIG. 10C is a side view of the phosphor wheel. FIG. 10D is a cross-sectional view of the phosphor wheel in FIG. 10B taken along line 10D-10D. FIG. 10E is a cross-sectional view of the phosphor wheel in FIG. 10B taken along line 10E-10E. FIG. 10F is a view schematically showing a path of airflow near the phosphor wheel. In (a) of FIG. 10F, a cross-section of the phosphor wheel taken along a radial direction is shown. In (b) of FIG. 10F, there is shown a cross-section of a portion in which opening 413c and blades 433a and 433b are provided in the phosphor wheel taken along a circumferential direction. In (c) of FIG. 10F, there is shown a cross-section of a portion in which opening 13d and blade 433f are provided in the phosphor wheel taken along a circumferential direction. Note that, in phosphor wheel 413 in FIG. 10F, a disc-shaped member and a substrate are collectively illustrated as one member.

As shown in FIGS. 10A through 10E, phosphor wheel 413 in the fourth exemplary embodiment 4 has such a structure that phosphor wheel 13 in the first exemplary embodiment is left-and-right reversed. Specifically, phosphor wheel 413 has substrate 413a whose structure is configured to reverse left and right of substrate 13a of phosphor wheel 13, and disc-shaped member 433 whose structure is configured to reverse left and right of disc-shaped member 33 of phosphor wheel 13. Blade 433a is extended upwardly from a rear end in the rotation direction of opening 433cb. Blade 433b is extended rearwardly and downwardly from a front end in the rotation direction of opening 433cb. Blade 433f is extended rearwardly and upwardly from a front end in the rotation direction of opening 13d. Further, pressurization fan 15 shown in FIG. 5 is rotated in a direction opposite to the rotation direction in the first exemplary embodiment. The structures other than this, which include the rotation direction of phosphor wheel 413 and the like, is the same as in the first exemplary embodiment.

According to the above-mentioned structure, as shown in FIG. 10F, the air pressure on a rear side in the rotation direction of blade 433f is more decreased than that of the surrounding area of the rear side during rotation of phosphor wheel 413, so that the air on the second face side flows into the first face side through opening 13d. Further, the air pressure on a rear side in the rotation direction of blade 433b is more decreased than that of the surrounding area of the rear side during rotation of phosphor wheel 413, so that the air on the first face side, which has flowed into the first face side through opening 13d, flows into the second face side through opening 413c. Furthermore, the air that has flowed into the first face side through opening 13d flows through near the surface of phosphor layer 16 at high speed, more easily. Accordingly, the heat generated in phosphor layer 16 can be absorbed effectively. Therefore, the same cooling effect as in the first exemplary embodiment can be obtained.

Note that, to achieve the reversely directed airflow like FIG. 10F, phosphor wheel 13 in the first exemplary embodiment is rotated in a direction opposite to the rotation direction shown in FIG. 7B, and pressurization fan 15 is rotated in a direction opposite to the rotation direction in the first exemplary embodiment.

Fifth Exemplary Embodiment

Figure 11A:
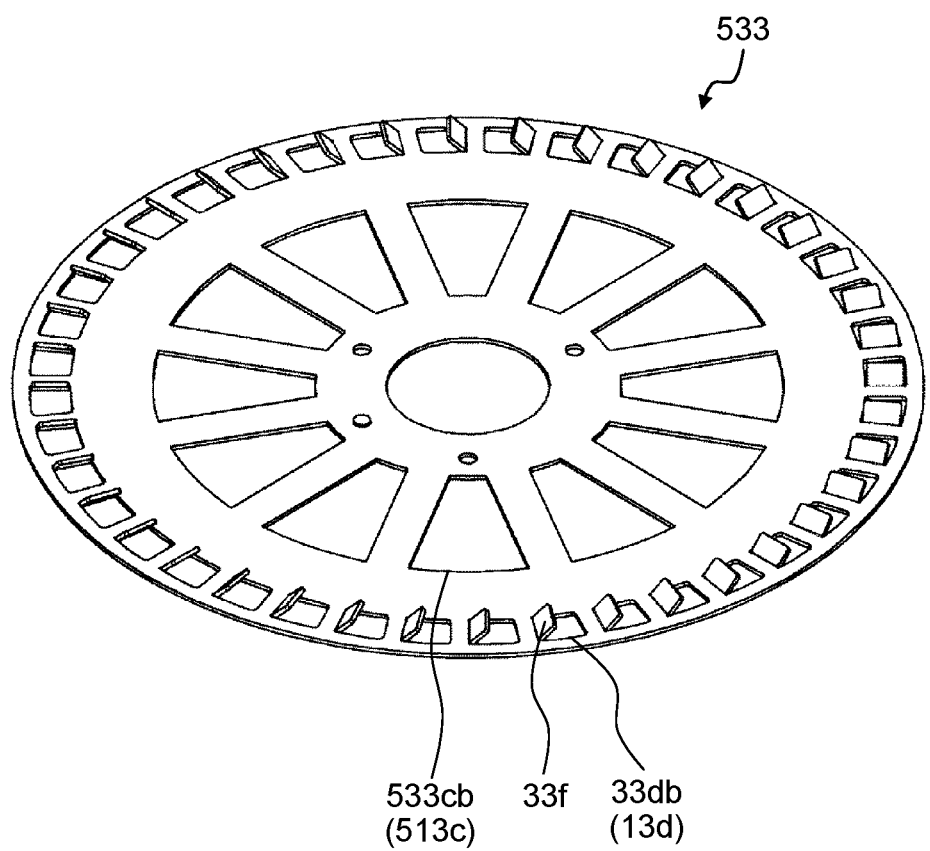
FIG. 11A is a perspective view showing an upper face side of a disc-shaped member of a phosphor wheel in a fifth exemplary embodiment.
Figure 11B:
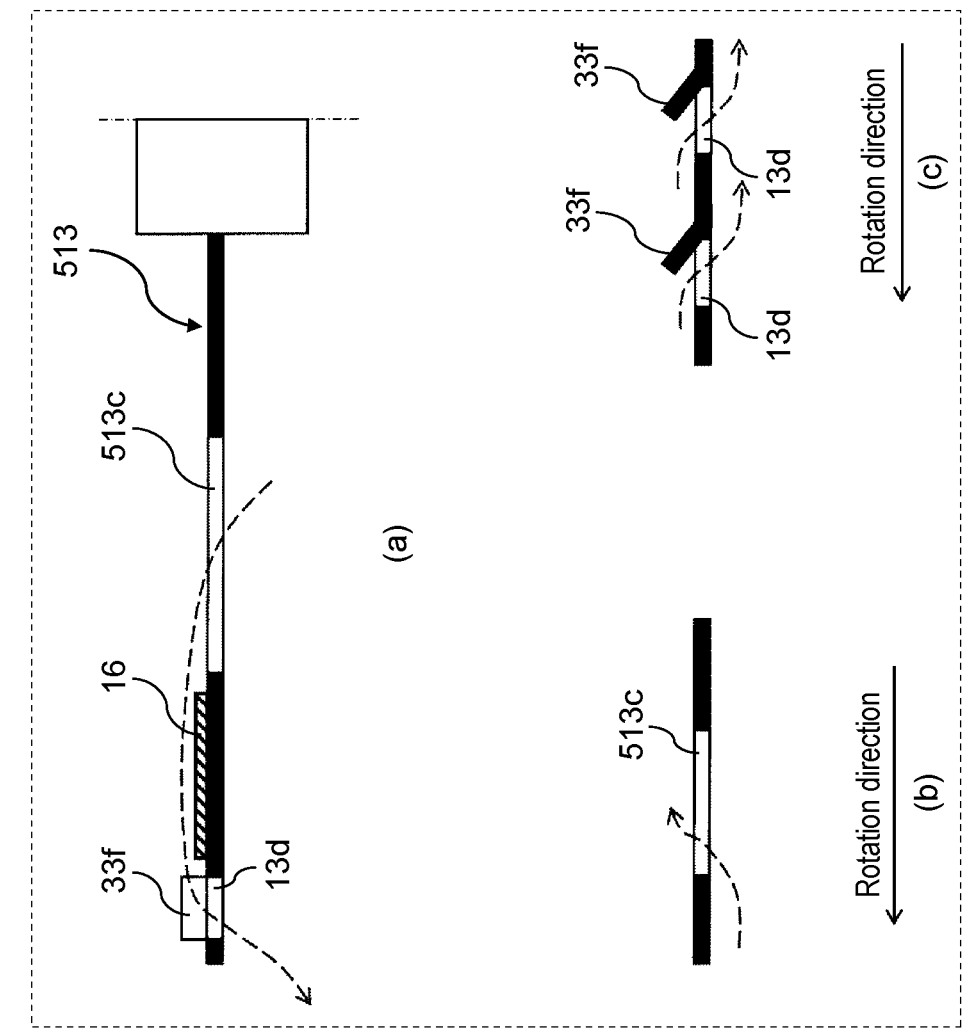
FIG. 11B is a view schematically showing a path of airflow near the phosphor wheel.

A fifth exemplary embodiment will be described with reference to FIGS. 11A and 11B. FIG. 11A is a perspective view showing an upper face side of a disc-shaped member of a phosphor wheel in the fifth exemplary embodiment. FIG. 11B is a view schematically showing a path of airflow near a phosphor wheel. In (a) of FIG. 11B, a cross-section of the phosphor wheel taken along a radial direction is shown. In (b) of FIG. 11B, there is shown a cross-section of a portion in which opening 513c is provided in the phosphor wheel taken along a circumferential direction. In (c) of FIG. 11B, there is shown a cross-section of a portion in which opening 13d and blade 33f are provided in the phosphor wheel taken along a circumferential direction. Note that, in phosphor wheel 513 of FIG. 11B, a disc-shaped member and a substrate are collectively illustrated as one member.

In phosphor wheel 513 in the fifth exemplary embodiment, as shown in FIG. 11A, any blades are not provided at an edge of opening 533cb of disc-shaped member 533. Note that, in the present exemplary embodiment, substrate 13a in the first exemplary embodiment, shown in FIGS. 7F, 7G, and the like, may be employed as a substrate. Disc-shaped member 533 in FIG. 11A and substrate 13a in the first exemplary embodiment, shown in FIGS. 7F, 7G, and the like, are combined to obtain the phosphor wheel in the fifth exemplary embodiment, although not illustrated in particular. In such a phosphor wheel, any blades are not provided in opening 513c on an inner circumferential side of phosphor layer 16.

According to the above-mentioned structure, when phosphor wheel 513 rotates, blade 33f having the same structure as in the first exemplary embodiment is rotated to draw the air, which flows on the first face side of phosphor wheel 513, to the second face side through opening 13d, as shown in FIG. 11B. Further, at this time, the air on the second face side is drawn to the first face side through opening 513c located closer to the inner circumferential side than opening 13d is. In other words, during rotation of phosphor wheel 513, the air on the second face side can be drawn to the first face side through opening 513c (second opening), and the drawn air can be sent to the second face side through opening 13d (first opening). Accordingly, as shown in (a) of FIG. 11B, the same airflow as in the first exemplary embodiment is obtained. The present exemplary embodiment can absorb the heat generated in phosphor layer 16, while reducing time and effort for forming the blades of disc-shaped member 533.

Sixth Exemplary Embodiment

Figure 12:
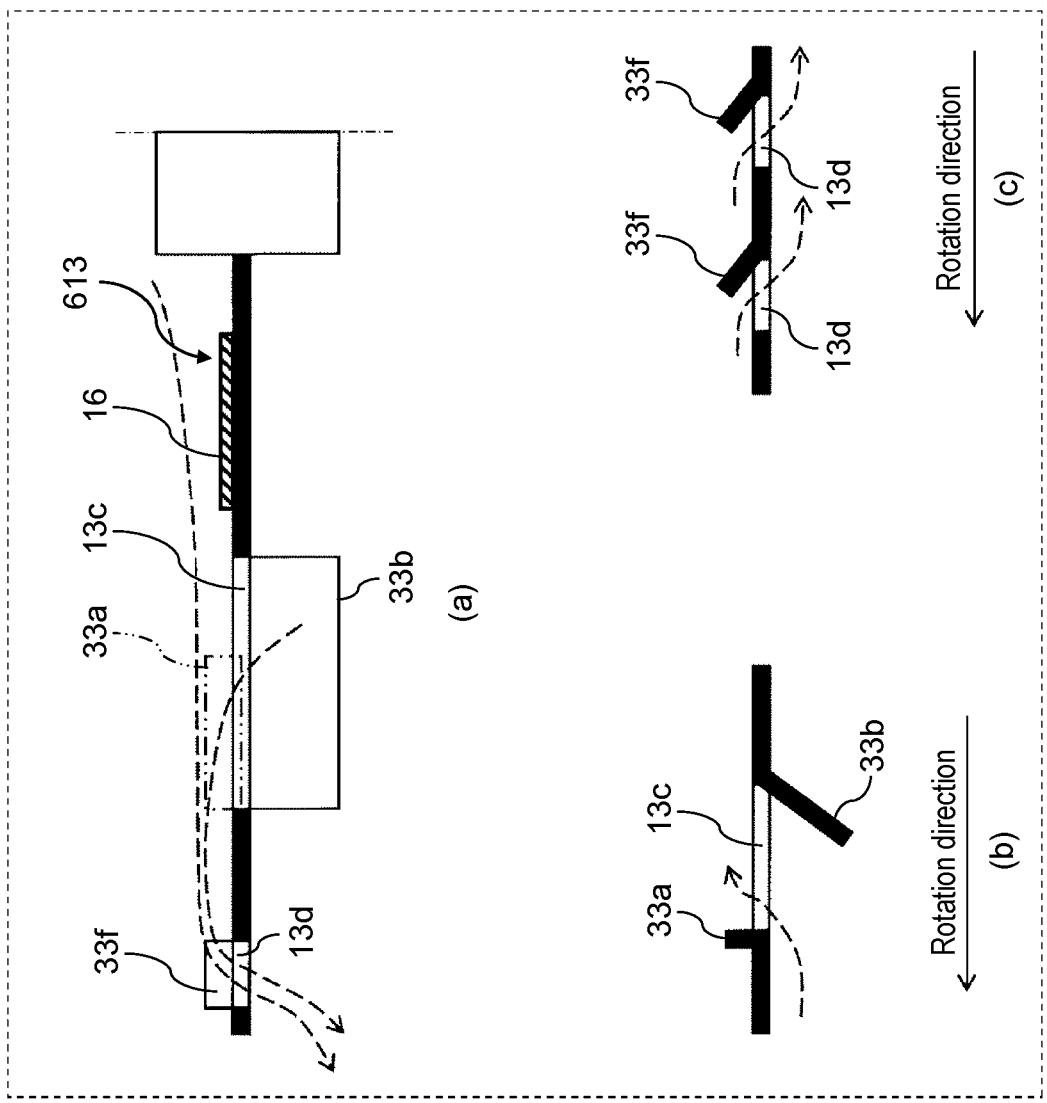
FIG. 12 is a view schematically showing a path of airflow near a phosphor wheel in a sixth exemplary embodiment.

A sixth exemplary embodiment 6 will be described with reference to FIG. 12. FIG. 12 is a view schematically showing a path of airflow near a phosphor wheel in the sixth exemplary embodiment. In (a) of FIG. 12, a cross-section of the phosphor wheel taken along a radial direction is shown. In (b) of FIG. 12, there is shown a cross-section of a portion in which blades 33a and 33b are provided taken along a circumferential direction. In (c) of FIG. 12, there is shown a cross-section of a portion in which blade 33f is provided taken along a circumferential direction. Note that, in phosphor wheel 613 of FIG. 12, a disc-shaped member and a substrate are collectively illustrated as one member.

In phosphor wheel 13 of the first exemplary embodiment, opening 13c and blades 33a and 33b are provided on the inner circumferential side of phosphor layer 16 of phosphor wheel 13, and opening 13d and blade 33f are provided on the outer circumferential side of phosphor layer 16. On the other hand, in phosphor wheel 613 of the sixth exemplary embodiment, opening 13c and blades 33a and 33b, and opening 13d and blade 33f both are provided on the outer circumferential side of phosphor layer 16.

According to the above-mentioned structure, the air on the second face side of phosphor wheel 613 is drawn to the first face side through opening 13c by blade 33b, like the first exemplary embodiment. The air that has been drawn to the first face side is drawn to the second face side through opening 13d by blade 33f. According to the airflow, the air on a center side of the first face of the phosphor wheel can also be drawn to the second face side through opening 13d by blade 33f. According to the present exemplary embodiment, even when both openings 13c and 13d are provided on the outer circumferential side of phosphor layer 16, the heat generated in phosphor layer 16 is absorbed, so that phosphor layer 16 can be cooled.

Note that, it goes without saying that each opening and each blade described in the second to fifth exemplary embodiments are also applicable, even when opening 13c and blades 33a and 33b, and opening 13d and blade 33f both are disposed on the outer circumferential side of phosphor layer 16, like the sixth exemplary embodiment.

Seventh Exemplary Embodiment

Figure 13:
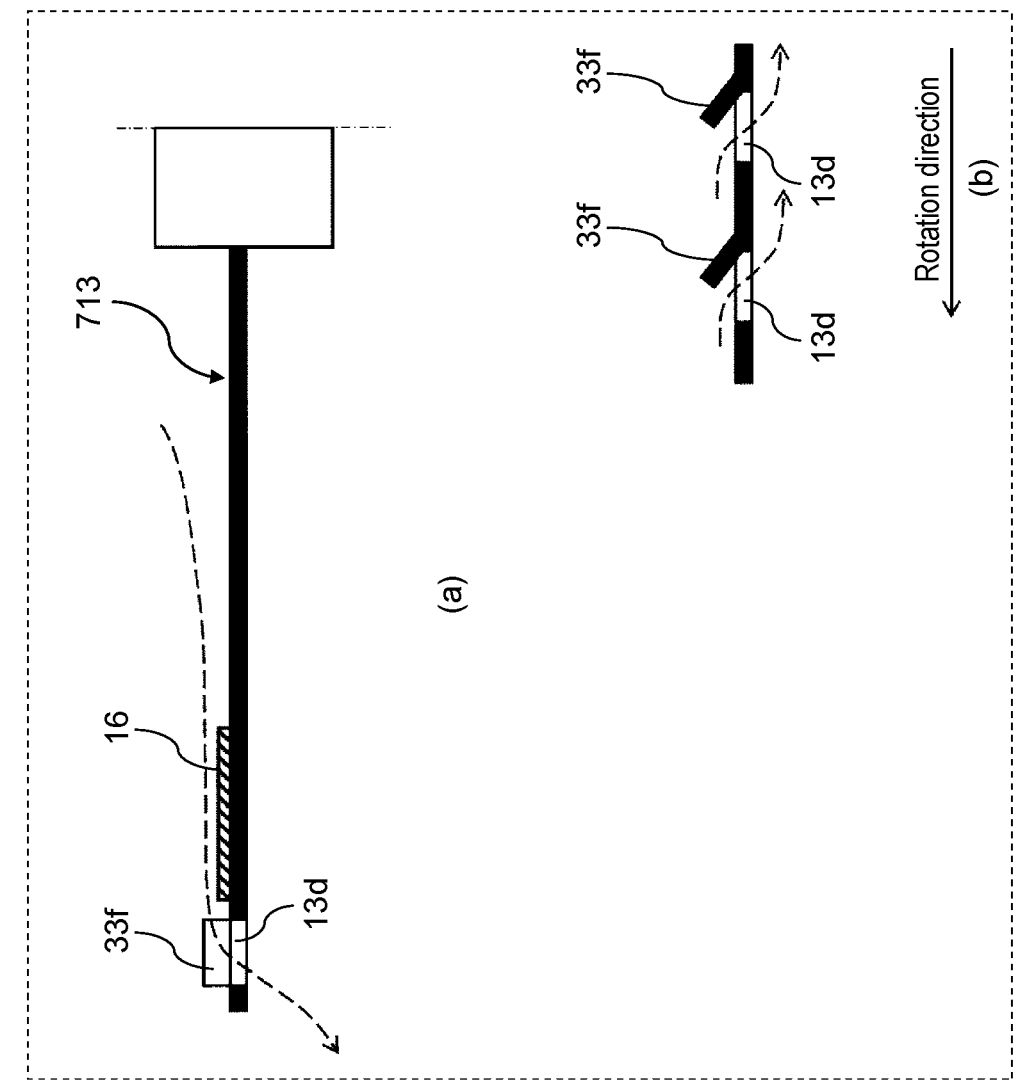
FIG. 13 is a view schematically showing a path of airflow near a phosphor wheel in a seventh exemplary embodiment.

A seventh exemplary embodiment will be described with reference to FIG. 13. FIG. 13 is a view schematically showing a path of airflow near a phosphor wheel. In (a) of FIG. 13, a cross-section of the phosphor wheel taken along a radial direction is shown. In (b) of FIG. 13, there is shown a cross-section of a portion in which blade 33f is provided taken along a circumferential direction.

In phosphor wheel 13 of the first exemplary embodiment, opening 13c and blades 33a and 33b are provided on the inner circumferential side of phosphor layer 16 of phosphor wheel 13, and opening 13d and blade 33f are provided on the outer circumferential side of phosphor layer 16. On the other hand, in phosphor wheel 713 of the seventh exemplary embodiment, only opening 13d and blade 33f are provided on the outer circumferential side of phosphor layer 16.

According to the above-mentioned structure, blade 33f having the same structure as in the first exemplary embodiment is rotated to draw the air, which flows on the first face side of phosphor wheel 713, to the second face side through opening 13d. Note that, in the present exemplary embodiment, any openings are not provided on the inner circumferential side of phosphor layer 16, so that air can hardly be supplied to the first face side from the second face side. Therefore, in the case where air is supplied from a central upper part of the first face of phosphor wheel 713, the present exemplary embodiment is applicable suitably. Phosphor wheel 713 of the present exemplary embodiment can absorb the heat generated in phosphor layer 16, while reducing time and effort for forming the blades on the inner circumferential side.

Note that, it goes without saying that opening 13d and blade 33f described in the second to fourth exemplary embodiments are also applicable, even when only opening 13d and blade 33f are provided on the outer circumferential side of phosphor layer 16, like the seventh exemplary embodiment.

Eighth Exemplary Embodiment

1. Structure

Figure 14A:
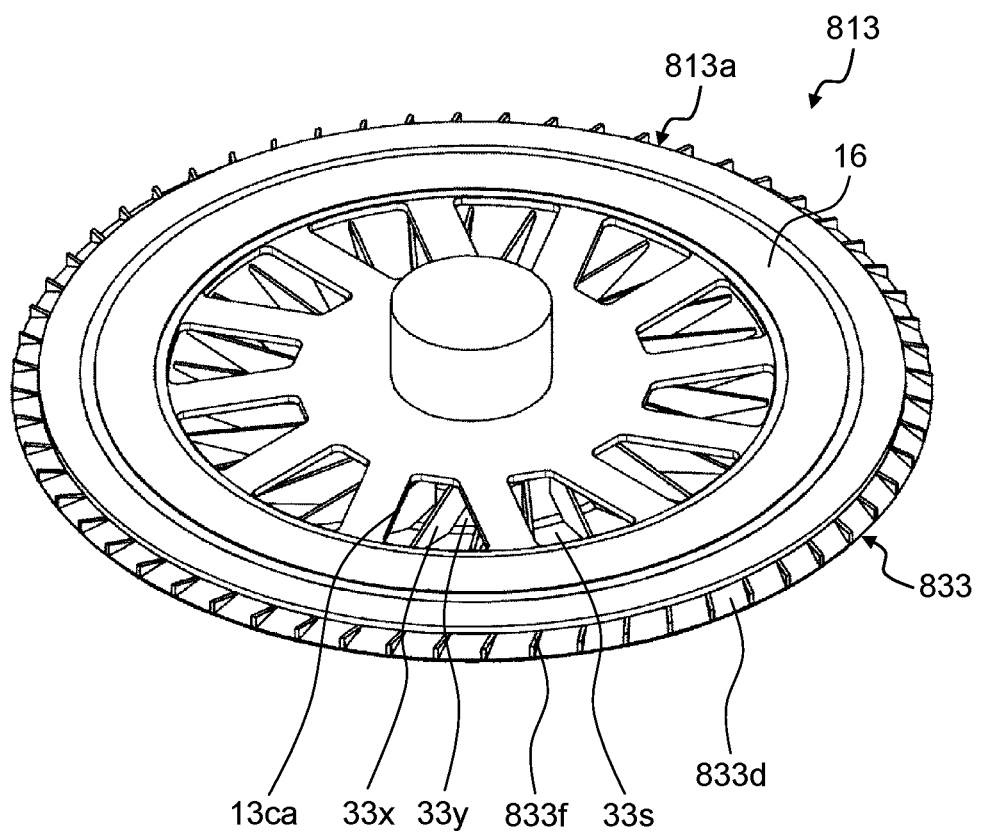
FIG. 14A is a perspective view showing a first face side of a phosphor wheel in a eighth exemplary embodiment.
Figure 14B:
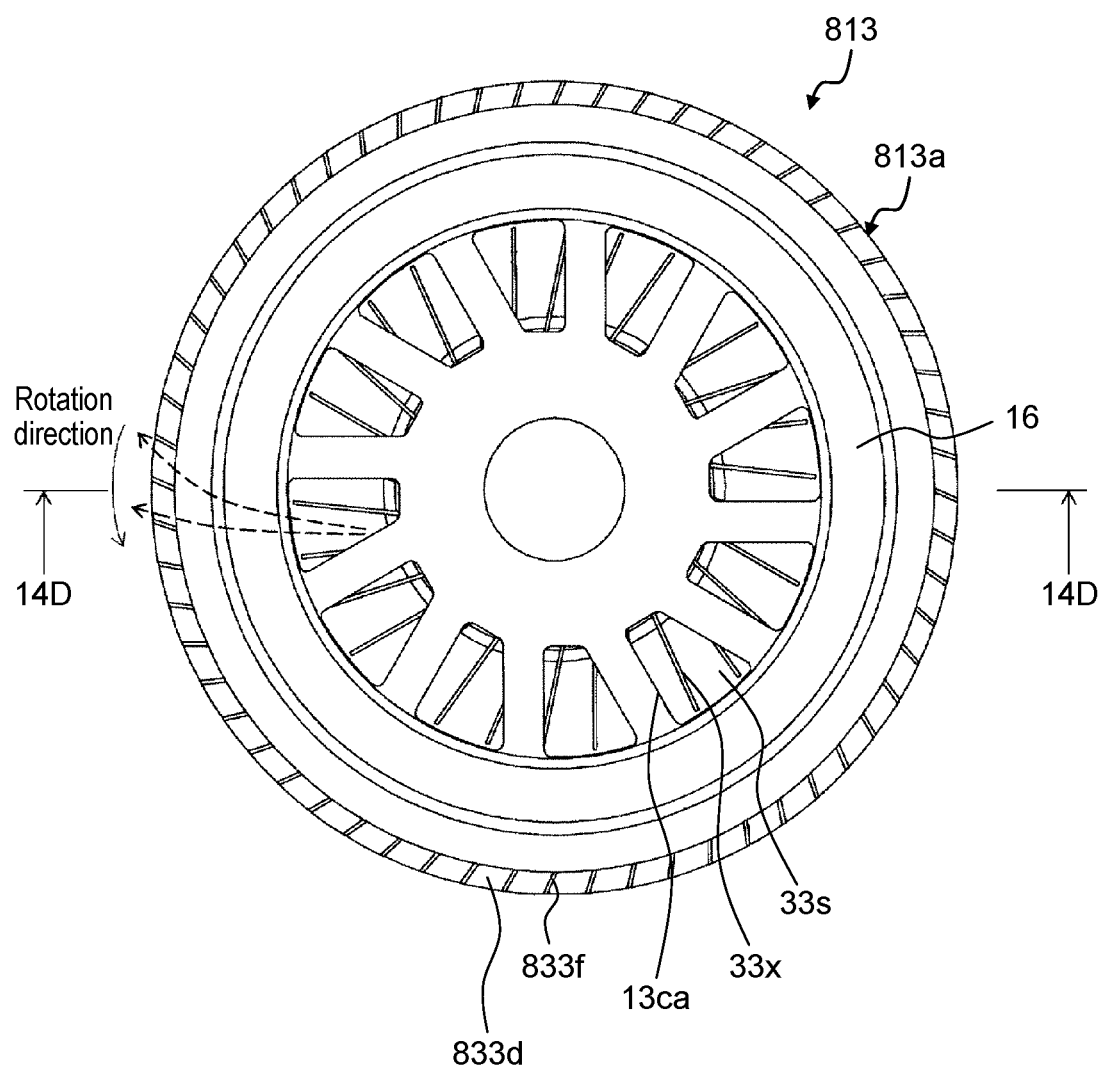
FIG. 14B is a plan view showing the first face side of the phosphor wheel.
Figure 14D:
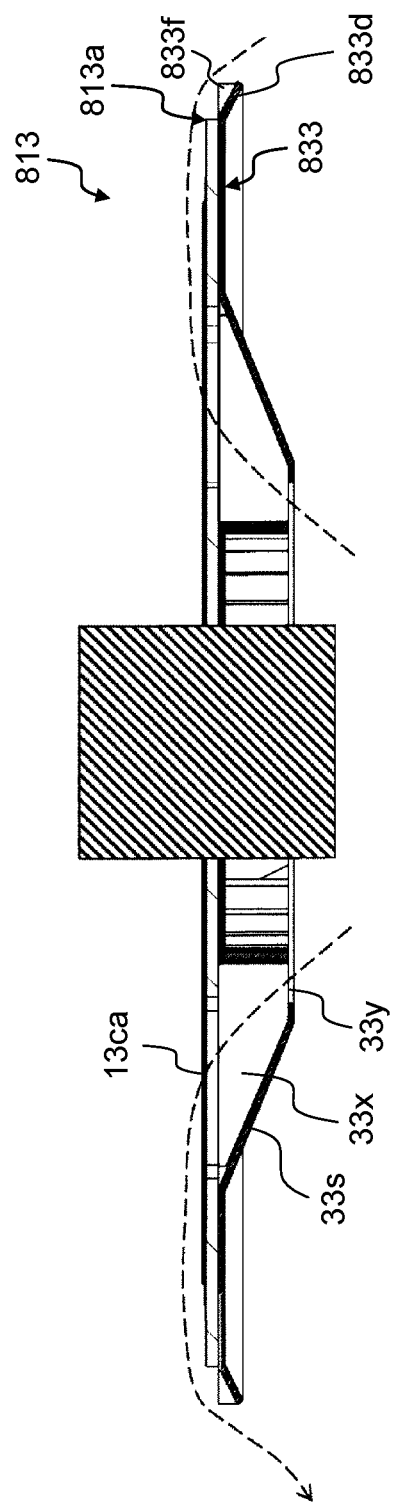
FIG. 14D is a cross-sectional view of the phosphor wheel in FIG. 14B taken along line 14D-14D.

An eighth exemplary embodiment 8 will be described with reference to FIGS. 14A through 14D. FIG. 14A is a perspective view showing a first face side of a phosphor wheel in the eight exemplary embodiment. FIG. 14B is a plan view showing the first face side of the phosphor wheel. FIG. 14C is a side view of the phosphor wheel. FIG. 14D is a cross-sectional view of the phosphor wheel taken along line 14D-14D of FIG. 14B.

In phosphor wheel 13 of the first exemplary embodiment, opening 13c and blades 33a and 33b are provided on the inner circumferential side of phosphor layer 16 of phosphor wheel 13, and opening 13d and blade 33f are provided on the outer circumferential side of phosphor layer 16. On the other hand, in phosphor wheel 813 of the eighth exemplary embodiment, any openings are not provided on the outer circumferential side of phosphor layer 16, but only blade 833f is provided at an edge portion on an outer circumferential side of phosphor wheel 813.

Specifically, substrate 813a has a structure similar to that of FIG. 8F in the second exemplary embodiment, and has no openings on the outer circumferential side of phosphor layer 16, although having opening 13ca on the inner circumferential side of phosphor layer 16.

Further, instead of disc-shaped member 33 in the first exemplary embodiment, dish-shaped member 833, which has a circular dish-like shape whose axis side is recessed with respect to its outer circumferential side, is employed as shown in FIGS. 14C and 14D. Annular opening 33y is provided on a center side of dish-shaped member 833, and inclined portion 33s with an annular slope is provided around annular opening 33y. On an upper face of annular inclined portion 33s, blades 33x projecting upward (first face side) are provided at third predetermined angular intervals in a circumferential direction, as shown also in FIGS. 14A and 14B.

Further, as shown also in FIGS. 14A and 14B, outer circumferential portion 833d of dish-shaped member 833 is inclined downward. On outer circumferential portion 833d of dish-shaped member 833, blades 833f projecting upward are provided at fourth predetermined angular intervals in the circumferential direction.

According to the above-mentioned structure, when phosphor wheel 813 rotates, blade 33x is rotated to draw the air, which flows on the second face side of phosphor wheel 813, into a space between substrate 813a and dish-shaped member 833 from opening 33y of dish-shaped member 833. The drawn air rises up along inclined portion 33s, and flows out to the first face side from opening 13ca of substrate 813a. In other words, an opening passing through phosphor wheel 813 between the first face and the second face is formed by opening 13ca of substrate 813a and opening 33y of dish-shaped member 833. Herein, blade 33x is formed to project to the first face side from dish-shaped member 833, but blade 33x may be formed on substrate 813a so as to project to the second face side from substrate 813a.

The air flowing out to the first face side absorbs the heat generated in phosphor layer 16, when passing through above phosphor layer 16. Especially, in the present exemplary embodiment, the outer circumferential portion of dish-shaped member 833 is inclined to the second face side, and blades 833f projecting upward are provided on the outer circumferential portion. Thus, the airflow passing through above phosphor layer 16 is attracted to the second face side during rotation of phosphor wheel 813, so that a path of the airflow is bent downward. Therefore, the heat generated in phosphor layer 16 is absorbed effectively, thereby making it possible to cool phosphor layer 16. In other words, outer circumferential portion 833d of dish-shaped member 833 is a passage for sending air to the second face from the first face.

2. Effect

Phosphor wheel 813 in the present exemplary embodiment includes a first face that has phosphor layer 16, a second face on an opposite sided to the first face, and blade 833f (first blade) provided to project from the first face. Blades 833f is provided to send the air on the first face side to the second face side through the outer circumferential edge of the first face during rotation of phosphor wheel 13.

Thus, the heat generated in a fluorescent substance of phosphor layer 16 on the first face side can be dissipated to the second face side opposite to the first face side. Therefore, cooling performance of phosphor wheel 13 is improved.

Phosphor wheel 813 of the present exemplary embodiment further includes openings 13ca and 33y (second opening) provided to pass through between the first face and the second face, and blades 33x (second blade) provided to project to the first face (one of the first face and the second face) side. Blade 33x is provided to send the air on the second face side to the first face side through openings 13ca and 33y during rotation of phosphor wheel 813.

Thus, cooling air can be sent to the first face side on which phosphor layer 16, which generates heat, is provided. Therefore, cooling performance of phosphor wheel 13 is more improved.

In phosphor wheel 813 of the present exemplary embodiment, blade 833f (first blade) is disposed on outer circumferential portion 833d of the first face, which is located on the outer circumferential side of phosphor layer 16, and openings 13ca and 33y are disposed on the inner circumferential side of phosphor layer 16.

Thus, the cooling air, which is sent to the first face side through openings 13ca and 33yl, flows toward blades 833f on the outer circumferential side automatically, due to centrifugal force caused by rotation of phosphor wheel 813. Therefore, cooling performance of phosphor wheel 13 is further improved.

Other Exemplary Embodiments

As mentioned above, one exemplary embodiment of the present disclosure has been described, but the present disclosure is not limited to the above-mentioned exemplary embodiment, and various modifications may be made without departing from the scope of the disclosure.

(A)

In the above-mentioned exemplary embodiment, a phosphor wheel is constituted by two members, i.e., a disc-shaped substrate and a disc-shaped member, or a disc-shaped substrate and a dish-shaped member having a disc shape. The phosphor wheel, however, may also be constituted by the above-mentioned each blade, each opening, and a single disc-shaped member with a phosphor layer.

(B)

In the above-mentioned exemplary embodiment, as shown in FIG. 5 or the like, it is illustrated, by example, that pressurization fan 15 is provided in a lower space of phosphor wheel 13, in order to cause the airflow generated by the blade provided in the phosphor wheel to circulate in casing unit 11 efficiently. The present disclosure, however, is not limited to this. For instance, a phosphor wheel device may not have a pressurization fan in a case unit, and a light conversion device using the same may be employed. In this case, the airflow generated by the blade provided on the phosphor wheel may be used to cool air containing the heat, which is generated in the phosphor layer, in a heat absorber.

To circulate the airflow passing through the inside of the heat absorber efficiently, however, only wind force caused by the blade may not be sufficient. Therefore, if fins of the heat absorber have a large pressure loss, for example, it will be preferred that pressurization fan 15 is provided to send air in the same direction as the airflow generated by the blade flows.

(C)

In the above-mentioned exemplary embodiment, as shown in FIG. 5 or the like, it is illustrated, by example, that updraft guide 11e for raising up airflow is provided on an upper face of bottom portion 11d, which corresponds to a lower space of phosphor wheel 13 in casing unit 11. The present disclosure, however, is not limited to this. For instance, a phosphor wheel device may not have an updraft guide, and a light conversion device using the same may be employed. In this case, only wind force caused by the blade is used to raise the airflow, which has passed through the heat absorber, along an axial direction. However, this may make it difficult to circulate the airflow sufficiently. Therefore, like the above-mentioned exemplary embodiment, pressurization fan 15 may be provided to send air in the same direction as the airflow generated by the blade flows. Thus, even if not providing an updraft guide, a sufficient circulation of airflow will be obtained in casing unit 11.

(D)

In the above-mentioned exemplary embodiment, as shown in FIG. 2 or the like, it is illustrated, by example, that the heat generated in phosphor layer 16 of the phosphor wheel is absorbed in heat absorber 21 through air, and then dissipated to the outside from heat dissipater 22 thermally connected to heat absorber 21 via heat pipe 24. The present disclosure, however, is not limited to this. For instance, an outer wall fin may be provided on an external face of the casing unit accommodating the phosphor wheel device and the light conversion device. The heat generated in the phosphor layer of the phosphor wheel may be dissipated to the outside through the outer wall fin. In other words, in addition to the heat dissipation function of the heat dissipater, the above-mentioned structure may also have a heat dissipation function from the outer wall fin, i.e., dissipate heat from the outer wall fin of the casing unit, so that the heat generated in a portion of the phosphor layer can be dissipated to the outside more efficiently.

(E)

In the above-mentioned exemplary embodiment, it is illustrated, by example, that the heat generated in phosphor layer 16 of the phosphor wheel is dissipated to the outside through heat absorber 21 and heat dissipater 22, which are thermally connected to each other via heat pipe 24. The present disclosure, however, is not limited to this. For instance, the heat absorber and the heat dissipater may directly be connected to each other to remove a heat pipe from the light conversion device. Even in this case, the heat absorber and the heat dissipater are formed to pass through a partition of the casing unit and thermally connected to each other. Therefore, the heat absorber and the heat dissipater can dissipate the heat, which is generated in the phosphor layer of the phosphor wheel, to the outside, while circulating it inside the casing unit using the blade.

(F)

In the above-mentioned exemplary embodiment, it is illustrated, by example, that the phosphor wheel and the light conversion device of the present disclosure are mounted on projector 100 of a three-chip DLP type including three DMDs 7. The present disclosure, however, is not limited to this. For instance, the phosphor wheel and light conversion device of the present disclosure may be mounted on a projector of a one-chip DLP type in which a single DMD and a color wheel are combined.

(G)

In the above-mentioned exemplary embodiment, it is illustrated, by example, that the phosphor wheel and light conversion device of the present disclosure are mounted on projector 100 of a DLP type. The present disclosure, however, is not limited to this. For instance, the phosphor wheel and the light conversion device of the present disclosure may be mounted on a liquid crystal type of projector using LCD (Liquid Crystal Display) or LCOS (Liquid Crystal on Silicon).

(H)

In the above-mentioned exemplary embodiment, as the projection display apparatus in accordance with the present disclosure, projector 100 is illustrated, by example. The present disclosure, however, is not limited to this. For instance, the present disclosure may be applied to other projection display apparatuses, such as a rear projection television, other than projector 100.

INDUSTRIAL APPLICABILITY

The phosphor wheel of the present disclosure has an effect in which a cooling effect is more improved than before, and thus is widely available in a phosphor wheel device equipped with a phosphor wheel of which the heat generated in a fluorescent substance is enlarged due to an increase in brightness, a light conversion device, and a projection display apparatus.

What is claimed is:

1. A phosphor wheel comprising:
a first face that has a phosphor layer;
a second face located on an opposite side to the first face;
a first blade provided to project from one of the first face and the second face; and
a passage that sends air to the second face from the first face,
wherein
the first blade is provided to send air on a side of the first face to a side of the second face through the passage during rotation of the phosphor wheel,
the passage is a first opening provided to pass through the phosphor wheel between the first face and the second face,
the phosphor wheel further comprises:
a second opening provided to pass through the phosphor wheel between the first face and the second face; and
a second blade provided to project from one of the first face and the second face, and
the second blade is provided to send air on the side of the second face to the side of the first face through the second opening during rotation of the phosphor wheel.

2. The phosphor wheel according to claim 1, wherein the first blade is provided to draw air on the side of the second face into the side of the first face through the second opening, and send the drawn air to the side of the second face through the first opening during rotation of the phosphor wheel.

3. The phosphor wheel according to claim 1, wherein the phosphor layer has an annular shape centered on a rotation axis of the phosphor wheel, and
the first opening and the second opening are disposed to sandwich the phosphor layer in a radial direction of the phosphor wheel.

4. The phosphor wheel according to claim 2, wherein the phosphor layer has an annular shape centered on a rotation axis of the phosphor wheel, and
the first opening and the second opening are disposed to sandwich the phosphor layer in a radial direction of the phosphor wheel.

5. The phosphor wheel according to claim 3, wherein the first opening is disposed on an outer circumferential side of the phosphor layer, and
the second opening is disposed on an inner circumferential side of the phosphor layer.

6. The phosphor wheel according to claim 4, wherein the first opening is disposed on an outer circumferential side of the phosphor layer, and
the second opening is disposed on an inner circumferential side of the phosphor layer.

7. The phosphor wheel according to claim 1, wherein the passage is an outer circumferential portion of the first face inclined to toward the second face, and
the first blade is provided to project from the first face.

8. The phosphor wheel according to claim 7, wherein the first blade is disposed in the outer circumferential portion of the first face on an outer circumferential side of the phosphor layer, and
the second opening is disposed on an inner circumferential side of the phosphor layer.

9. A phosphor wheel device comprising:
the phosphor wheel according to claim 1;
a motor that drives the phosphor wheel to rotate; and
a casing unit in which a circulation path of airflow generated by the first blade is formed, the casing unit accommodating the phosphor wheel and the motor.

10. A light conversion device comprising:
the phosphor wheel device according to claim 9;
a heat absorber that absorbs heat generated near the phosphor layer of the phosphor wheel;
a heat dissipater that is thermally connected to the heat absorber and dissipates the heat of the airflow to an outside of the casing unit; and
an optical lens that is attached to an opening portion formed in the casing unit and converges light emitted from a fluorescent substance of the phosphor layer, while passing excitation light that excites the fluorescent substance of the phosphor layer.

11. The light conversion device according to claim 10, wherein
the first blade is disposed close to the optical lens so as to face the optical lens.

12. A projection display apparatus comprising:
the light conversion device according to claim 10;
a light source that emits the excitation light that excites the fluorescent substance of the phosphor layer;
a display element that forms a projection image using the light emitted from the light source; and
an optical component that optically connects the light source, the light conversion device, and the display element.

13. A phosphor wheel comprising:
a first face that has a phosphor layer;
a second face located on an opposite side to the first face;
a first blade provided to project from one of the first face and the second face; and
a passage that sends air to the second face from the first face,
wherein
the first blade is provided to send air on a side of the first face to a side of the second face through the passage during rotation of the phosphor wheel,
the passage is a first opening provided to pass through the phosphor wheel between the first face and the second face,
the phosphor wheel further comprises a second opening provided to pass through the phosphor wheel between the first face and the second face, and
the first blade is provided to draw air on the side of the second face into the side of the first face through the second opening, and send the drawn air to the side of the second face through the first opening during rotation of the phosphor wheel.

14. A phosphor wheel comprising:
a first face that has a phosphor layer;
a second face located on an opposite side to the first face;
a first blade provided to project from one of the first face and the second face; and
a passage that sends air to the second face from the first face,
wherein
the first blade is provided to send air on a side of the first face to a side of the second face through the passage during rotation of the phosphor wheel,
the passage is an outer circumferential portion of the first face inclined to toward the second face,
the first blade is provided to project from the first face,
the phosphor wheel further comprises:

a second opening provided to pass through the phosphor wheel between the first face and the second face; and a second blade provided to project to one of the first face and the second face, and the second blade is provided to send air on the side of the second face to the side of the first face through the second opening during rotation of the phosphor wheel.

* * * * *